United States Patent
Yamamoto et al.

(10) Patent No.: US 8,615,682 B2
(45) Date of Patent: Dec. 24, 2013

(54) NETWORK FAILURE DETECTING SYSTEM, MEASUREMENT AGENT, SURVEILLANCE SERVER, AND NETWORK FAILURE DETECTING METHOD

(75) Inventors: Hiroshi Yamamoto, Kawasaki (JP); Shunsuke Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 12/644,625

(22) Filed: Dec. 22, 2009

(65) Prior Publication Data

US 2010/0100768 A1    Apr. 22, 2010

Related U.S. Application Data

(63) Continuation of application No. PCT/JP2007/063176, filed on Jun. 29, 2007.

(51) Int. Cl.
  *G06F 11/00* (2006.01)

(52) U.S. Cl.
  USPC .................. 714/32; 714/37; 714/4.1; 714/33

(58) Field of Classification Search
  USPC ...................................... 714/32, 25, 4.1, 47.1
  See application file for complete search history.

(56) References Cited

U.S. PATENT DOCUMENTS

| | | | |
|---|---|---|---|
| 2003/0147386 A1* | 8/2003 | Zhang et al. .................. | 370/390 |
| 2003/0157896 A1* | 8/2003 | Mee et al. ..................... | 455/67.1 |
| 2005/0083834 A1 | 4/2005 | Dunagan et al. | |
| 2005/0132031 A1* | 6/2005 | Sailer et al. ................... | 709/223 |
| 2005/0193225 A1* | 9/2005 | Macbeth et al. ................ | 714/2 |
| 2007/0074076 A1 | 3/2007 | Imai et al. | |
| 2007/0234116 A1* | 10/2007 | Yoshikawa et al. ............. | 714/13 |

FOREIGN PATENT DOCUMENTS

| | | |
|---|---|---|
| JP | 5-114899 | 5/1993 |
| JP | 6-37782 | 2/1994 |
| JP | 11-275106 | 10/1999 |
| JP | 2000-242585 | 9/2000 |
| JP | 2003-249958 | 9/2003 |
| JP | 2005-124171 | 5/2005 |
| JP | 2006-246205 | 9/2006 |
| JP | 2007-96796 | 4/2007 |

OTHER PUBLICATIONS

International Search Report dated Sep. 11, 2007, from the corresponding International Application.
Miguel Castro, et al. "Scribe: A Large-Scale and Decentralized Application-Level Multicast Infrastructure" IEEE Journal on Selected Areas in Communications, vol. 20, No. 8, pp. 1489-1499, Oct. 2002.

(Continued)

*Primary Examiner* — Sarai Butler
(74) *Attorney, Agent, or Firm* — Katten Muchin Rosenman LLP

(57) ABSTRACT

Measurement agents in a network failure detecting system each configure a group together with other measurement agents that receive a service from the same provision server, and form a link to create a tree structure with a predetermined measurement agent in the group at its top. The measurement agent then receives measurement results from the other measurement agents in the group, and narrows down candidates of a failure location based on the received measurement results. The measurement agent transmits the narrowed candidates of the failure location to a surveillance server or one of the other measurement agents. The surveillance server then receives the transmitted candidates of the failure location, and specifies the failure location based on the received candidates of the failure location.

16 Claims, 24 Drawing Sheets

(56) References Cited

OTHER PUBLICATIONS

Ion Stoica, et al. "Chord: A Scalable Peer-to-Peer Lookup Protocol for Internet Applications" IEEE/ACM Transactions on Networking, vol. 11, No. 1, pp. 17-32, Feb. 2003.

Atsuo Tachibana, et al. "Empirical Study on Locating Congested Segments over the Internet Based on Multiple End-to-End Path Measurements" Proceedings of the 2005 Symposium on Applications and the Internet (SAINT'05), pp. 342-351, Jan. 31, 2005.

Akira Uchiyama, et al. "Implementation and Evaluation of a Distributed Network Monitor with Autonomous Grouping Mechanism" IPSJ SIG Technical Report, vol. 2003, pp. 51-56, Nov. 2003.

Wenliang Lin, et al. "Implementation of Dynamic Peer Group Operations in JXTA Network" Institute of Electronics, Information and Communication Engineers of Japan Society Conference, Mar. 7, 2005.

Notice of Rejection dated Aug. 16, 2011, from corresponding Japanese Application No. 2009-521456.

* cited by examiner

FIG.3

| GROUP ID | ROLE | UPSTREAM | DOWNSTREAM |
|---|---|---|---|
| 2 | 0 (MEASURE) | 192.168.10.1 | – |
| 4 | 1 (RELAY) | 192.168.11.3 | 192.168.22.1 |
| | | | 192.168.24.2 |
| | | | ⋮ |
| 6 | 2 (REPRESENTATIVE) | – | 192.168.32.1 |
| | | | 192.168.34.2 |
| | | | ⋮ |
| ⋮ | ⋮ | ⋮ | ⋮ |

FIG.4

| GROUP ID | RECEPTION QUALITY | PATH |
|---|---|---|
| 2 | OK | 192.168.2.1 |
| | | 192.168.3.2 |
| | | ⋮ |
| 8 | NG | 192.168.2.1 |
| | | 192.168.4.3 |
| | | 192.168.5.6 |
| | | ⋮ |
| 11 | NG | 192.168.2.1 |
| | | 192.168.6.4 |
| | | 192.168.7.1 |
| | | ⋮ |
| ⋮ | ⋮ | ⋮ |

FIG.7
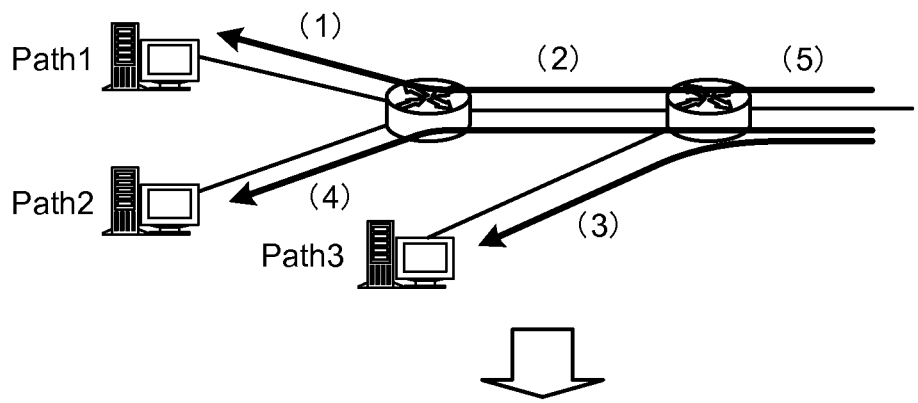
| | (1) | (2) | (3) | (4) | (5) | QUALITY |
|---|---|---|---|---|---|---|
| Path1 | 1 | 1 | | | 1 | NG |
| Path2 | | 1 | | 1 | 1 | NG |
| Path3 | | | 1 | | 1 | OK |
| | (1) | (2) | (3) | (4) | (5) | QUALITY |
|---|---|---|---|---|---|---|
| Path1 | 1 | 1 | | | 1 | NG |
| Path2 | | 1 | | 1 | 1 | NG |
| Path3 | | | 1 | | 1 | OK |
EXTRACT AS CANDIDATE
OF FAILURE LOCATION

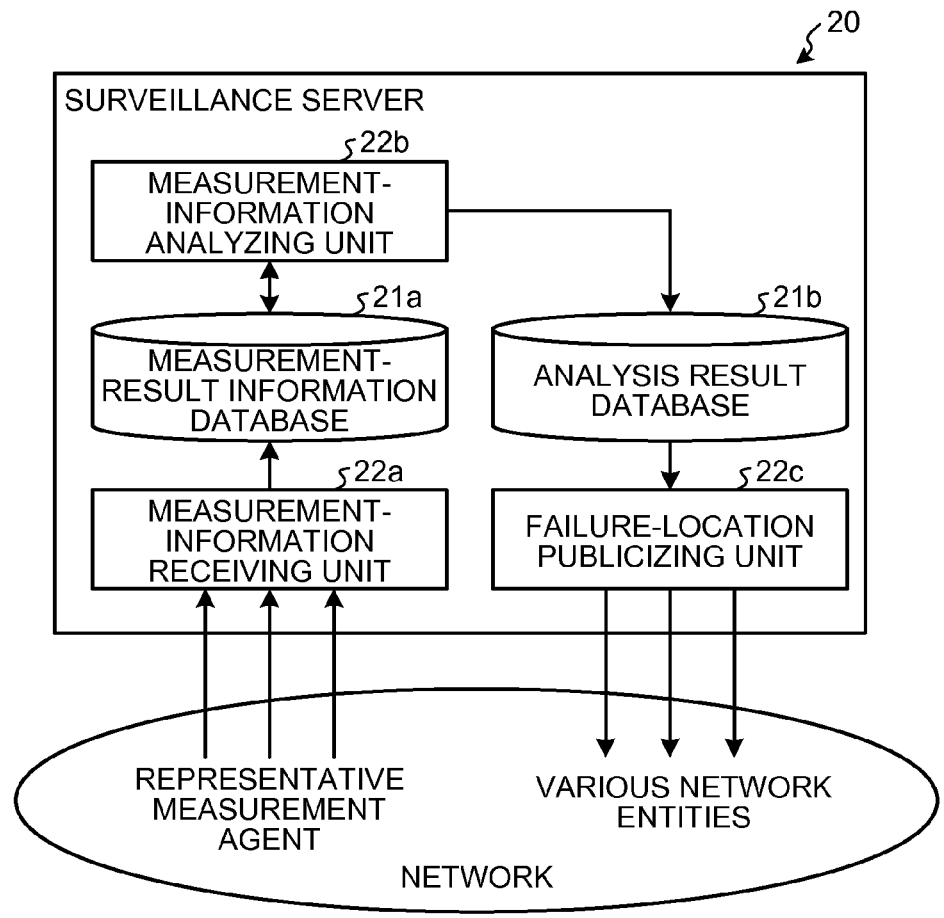

| RECEPTION QUALITY | PATH |
|---|---|
| NG | 192.168.2.1 |
| | 192.168.3.2 |
| NG | 192.168.5.1 |
| | 192.168.6.3 |
| ⋮ | ⋮ |

NETWORK FAILURE DETECTING SYSTEM, MEASUREMENT AGENT, SURVEILLANCE SERVER, AND NETWORK FAILURE DETECTING METHOD

CROSS-REFERENCE TO RELATED APPLICATION(S)

This application is a continuation of International Application No. PCT/JP2007/063176, filed on Jun. 29, 2007, the entire contents of which are incorporated herein by reference.

FIELD

The embodiments discussed herein are directed to a network failure detecting system, a measurement agent, a surveillance server, a network failure detecting method, and a network failure detecting program, in which measurement agents placed on a network measure qualities of services provided by provision servers, and a surveillance server analyzes results of the measurement, thereby specifying a failure location.

BACKGROUND

In common techniques, measurement agents placed on a network measure qualities of services provided by provision servers, and a surveillance server analyzes results of measurement, thereby specifying a failure location (for example, a faulty router or switch, or a router or switch in which a packet transfer process is delayed).

A technique that enables measurement agents to inform a surveillance server of all information measured by the measurement agents and enables the surveillance server to specify a failure location is known as one of the common techniques (see Japanese Laid-open Patent Publication No. 2000-242585). Specifically, as depicted in FIG. 28, measurement agents placed on a network measure reception qualities and transmission paths of the services, and the surveillance server analyzes all measurement results. The surveillance server analyzes the measurement results received from the measurement agents and specifies a portion through which many of the services with deteriorated qualities pass as a cause of a failure.

Japanese Laid-open Patent Publication No. 11-275106 discloses a technique that enables to group a plurality of communicating devices located within a communicable range and to regard one of the communicating devices as a server and the others as clients. It is also possible to group measurement agents by using this technique and notify a surveillance server of measurement results in units of groups.

However, in the technique described in Japanese Laid-open Patent Publication No. 2000-242585, the surveillance server receives all the measurement results and analyzes the measurement results. Accordingly, the surveillance server manages a large amount of information, which causes memory overflow or the like and consequently prevents quick detection of a failure.

Further, in the technique using the technique described in Japanese Laid-open Patent Publication No. 11-275106, only the group of the measurement agents located within the communicable range is determined. Accordingly, loads on the surveillance server are great as in the technique above mentioned, which causes memory overflow or the like and consequently prevents quick failure detection.

SUMMARY

According to an aspect of an embodiment of the invention, A network failure detecting system includes measurement agents that are placed on a network and measure qualities of services provided by provision servers; and a surveillance server that analyzes measurement results of a quality of services measured by the measurement agents and specifies a failure location of the network. Each of the measurement agents includes a link forming unit that forms a link, by configuring a group together with other measurement agents that receive a service from a same provision server, thereby creating a tree structure with a predetermined measurement agent in the group at a top; a measurement-result receiving unit that receives the measurement results from the other measurement agents in the same group; a failure-location narrowing unit that narrows down candidates of the failure location based on the measurement results received by the measurement-result receiving unit; and a failure-location transmitting unit that transmits the candidates of the failure location narrowed down by the failure-location narrowing unit to the surveillance server or one of the other measurement agents. The surveillance server includes a failure-location receiving unit that receives the candidates of the failure location transmitted by the failure-location transmitting unit; and a failure-location specifying unit that specifies the failure location based on the candidates of the failure location received by the failure-location receiving unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a schematic diagram illustrating a group information table;

FIG. 4 is a schematic diagram illustrating a measurement information database;

FIG. 7 is a schematic diagram illustrating narrowing-down of a failure location;

FIG. 8 is a block diagram of a configuration of a surveillance server according to the first embodiment;

FIG. 9 is a schematic diagram illustrating a measurement information database;

DESCRIPTION OF EMBODIMENT(S)

Preferred embodiments of the present invention will be explained with reference to accompanying drawings. The present invention is mainly applied to an operation management system for real-time content services capable of constantly providing a network status, such as video distribution and online gaming. When reduction in accuracy of failure location detection is acceptable, the present invention can be also applied to non-real-time data transmission such as website or file transfer. The present invention particularly provides a system of detecting a failure on a network and a realizing system therefor that can be also applied to environments including a large number of computers or home gateways that receive services.

[a] First Embodiment

In the following descriptions, outlines and features of a network failure detecting system according to a first embodiment of the present invention, and a configuration and a process flow of the network failure detecting system are successively explained, and an effect of the first embodiment is finally explained.

Figure 1:
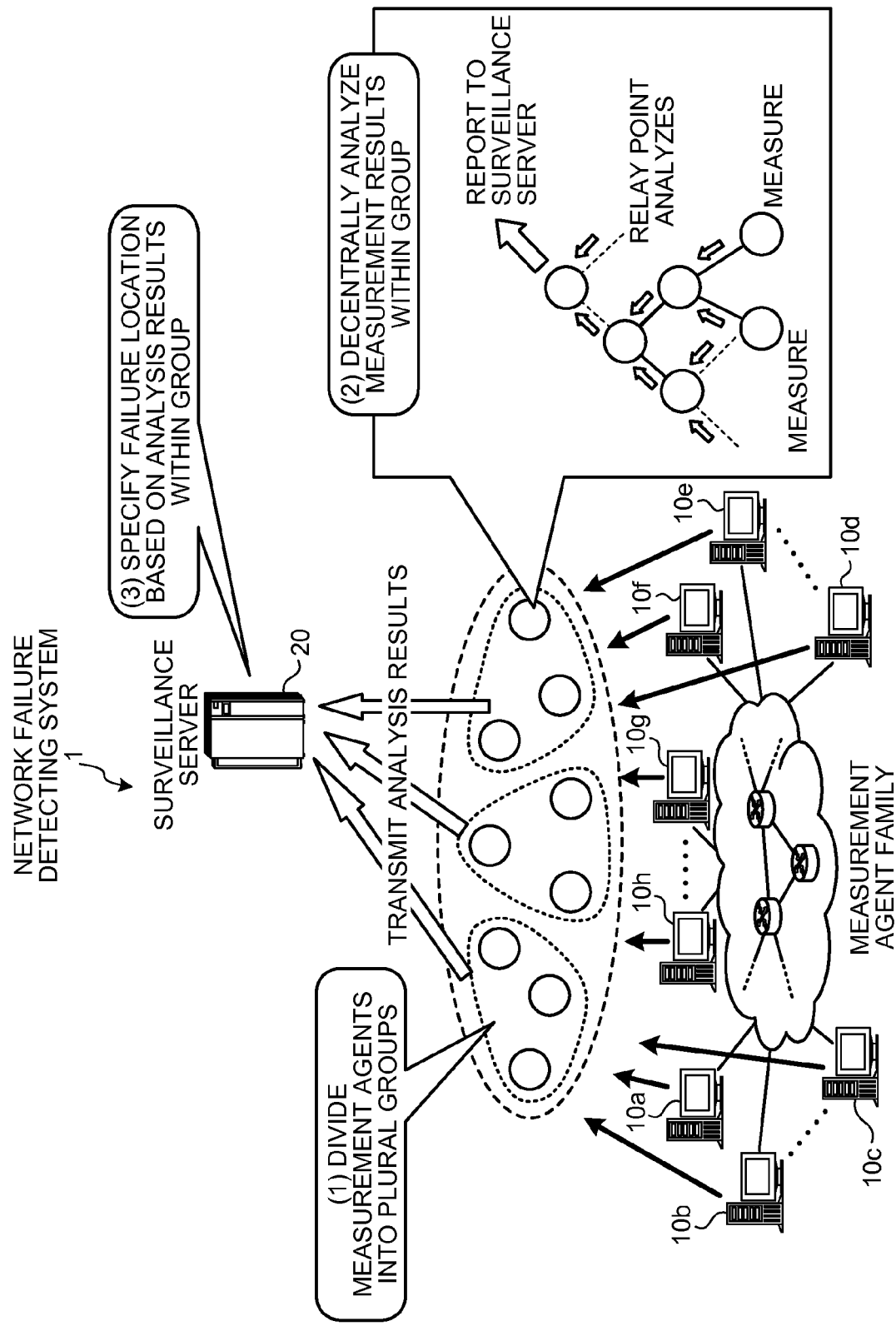
FIG. 1 is a schematic diagram illustrating outlines and features of a network failure detecting system according to a first embodiment of the present invention.

Outlines and Features of Network Failure Detecting System According to First Embodiment Outlines and features of the network failure detecting system according to the first embodiment are explained first with reference to FIG. 1. FIG. 1 is a schematic diagram illustrating outlines and features of the network failure detecting system according to the first embodiment. In the first embodiment explained below, the present invention is applied to an overlay network.

The overlay network applied with the present invention in the first embodiment is the general term for techniques that enable to extract necessary ones from nodes (such as a router, a computer, and a gateway) on a physical network, and configure a network for achieving a specific purpose without being bound by physical constraints. The overlay network is a so-called structured peer-to-peer (P2P) network that is complicated in implementation and enables to reliably find target information. Any overlay network that has nodes each managing IDs within a prescribed range and is capable of certainly delivering a search message to a node managing any ID by transferring the search message through a logical link established among the nodes can be applied to the present invention.

An outline of a network failure detecting system 1 according to the first embodiment is that measurement agents 10 placed on a network measure qualities of services provided by provision servers and a surveillance server 20 analyzes results of the measurement, thereby specify a failure location. A main feature of the network failure detecting system 1 is that particularly quick failure detection with high failure detection accuracy can be provided.

The main feature is specifically explained. As depicted in FIG. 1, the network failure detecting system 1 includes measurement agents (family of measurement agents) 10a to 10h that measure qualities of services, and the surveillance server 20 that specifies a failure location.

The measurement agent 10 in the network failure detecting system 1 composes a group with other measurement agents that receive a service from the same provision server, and forms a link to create a tree structure with a predetermined measurement agent in the group at the top (see (1) in FIG. 1). Specifically, the measurement agents 10a to 10h are divided into plural groups by using the overlay network technique so that the measurement agents 10 that receive a service from the same provision server belong to the same group.

The measurement agents 10 then receive measurement results from other measurement agents in the same group, and narrow down candidates of a failure location based on the received measurement results (see (2) in FIG. 1). That is, the measurement agents 10a to 10h transmit the measurement results to other measurement agents in the group, and the family of the measurement agents in the group decentrally analyzes the measurement results.

The measurement agents 10 transmit the narrowed candidates of the failure location to the surveillance server 20 or other measurement agents. The surveillance server 20 then receives the transmitted candidates of the failure location, and specifies the failure location based on the received candidates of the failure location (see (3) in FIG. 1). That is, the surveillance server 20 collects and analyzes results of a decentralized analysis in the groups. Accordingly, an amount of information managed by the surveillance server 20 can be reduced, and therefore the failure location on the network can be detected quickly without causing memory overflow or the like.

As described above, the network failure detecting system 1 groups the measurement agents that receive the service from the same provision server. The measurement agent family in the group then decentrally analyzes the measurement results to reduce the amount of information managed by the surveillance server, thereby quickly detecting the failure location on the network without causing memory overflow or the like. As a result, the network failure detecting system 1 provides particularly quick failure detection with high failure detection accuracy, as the main feature described above.

Configuration of Measurement Agent

Figure 2:
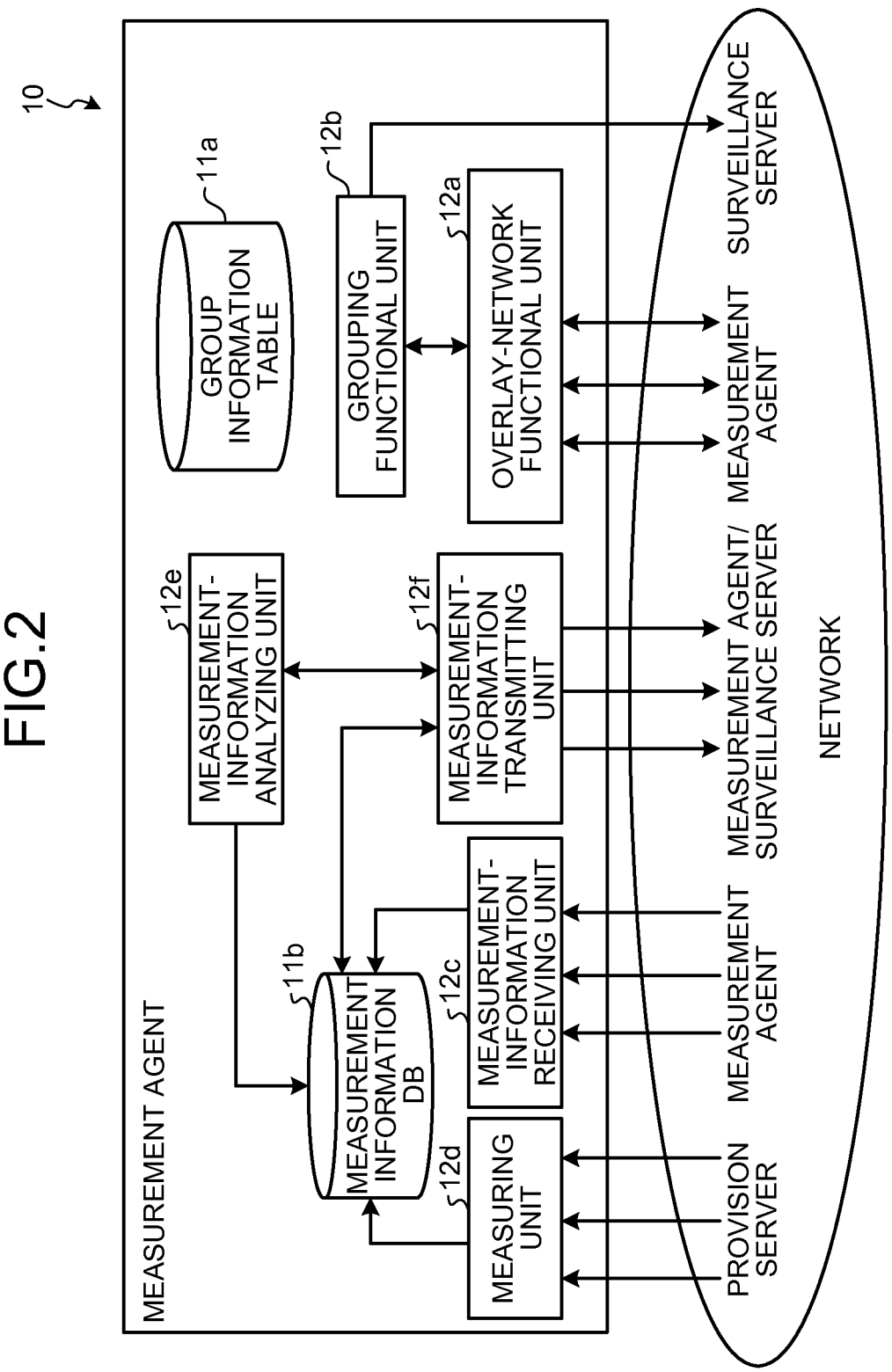
FIG. 2 is a block diagram of a configuration of a measurement agent according to the first embodiment.

A configuration of the measurement agent 10 depicted in FIG. 1 is explained with reference to FIG. 2. FIG. 2 is a block diagram of a configuration of the measurement agent 10 according to the first embodiment. As depicted in FIG. 2, the measurement agent 10 includes a group information table 11a, a measurement information database 11b, an overlay-network functional unit 12a, a grouping functional unit 12b, a measurement-information receiving unit 12c, a measuring unit 12d, a measurement-information analyzing unit 12e, and a measurement-information transmitting unit 12f. Processes performed by these units are explained below.

The group information table 11a has various kinds of information related to groups stored therein. Specifically, the group information table 11a has stored therein "group IDs" for uniquely identifying the groups, "roles" of the subject measurement agent, an IP address of one of other measurement agents that receives a search message transmitted by the subject measurement agent (hereinafter, "upstream"), and IP addresses of other measurement agents that transmit search messages to the subject measurement agent (hereinafter, "downstream"), which are associated with each other, as depicted in FIG. 3.

The measurement information database 11b has various kinds of information related to measurement stored therein. Specifically, the measurement information database 11b stores therein "group IDs", "reception qualities" indicating qualities of services (OK or NG), and "paths" which are information of routers relaying services transmitted from the provision servers to the measurement agent 10, which are associated with each other, as depicted in FIG. 4.

The overlay-network functional unit 12a performs processing to cause the measurement agent to join an overlay network. For example, when implementation of an overlay network "Chord[Stoica03]" is applied, the overlay-network functional unit 12a calculates an ID for uniquely identifying itself on a network, and establishes a virtual link with some other measurement agents that have already joined the overlay network. "Chord[Stoica03]" is a technique that enables to map nodes or contents in the same hash space by using a hash function, in which each node has a routing table for transferring a search message. The present invention is not limited to Chord, and can be applied to any overlay network in which each measurement agent manages IDs within a prescribed range and a search message can be certainly delivered to a measurement agent managing any ID by passing through the measurement agents.

Specifically, upon receipt of a search message transmitted from the grouping functional unit 12b, the overlay-network functional unit 12a transmits the search message including the group ID to the subsequent measurement agent according to a message transfer method of the overlay network to be applied.

Figure 5:
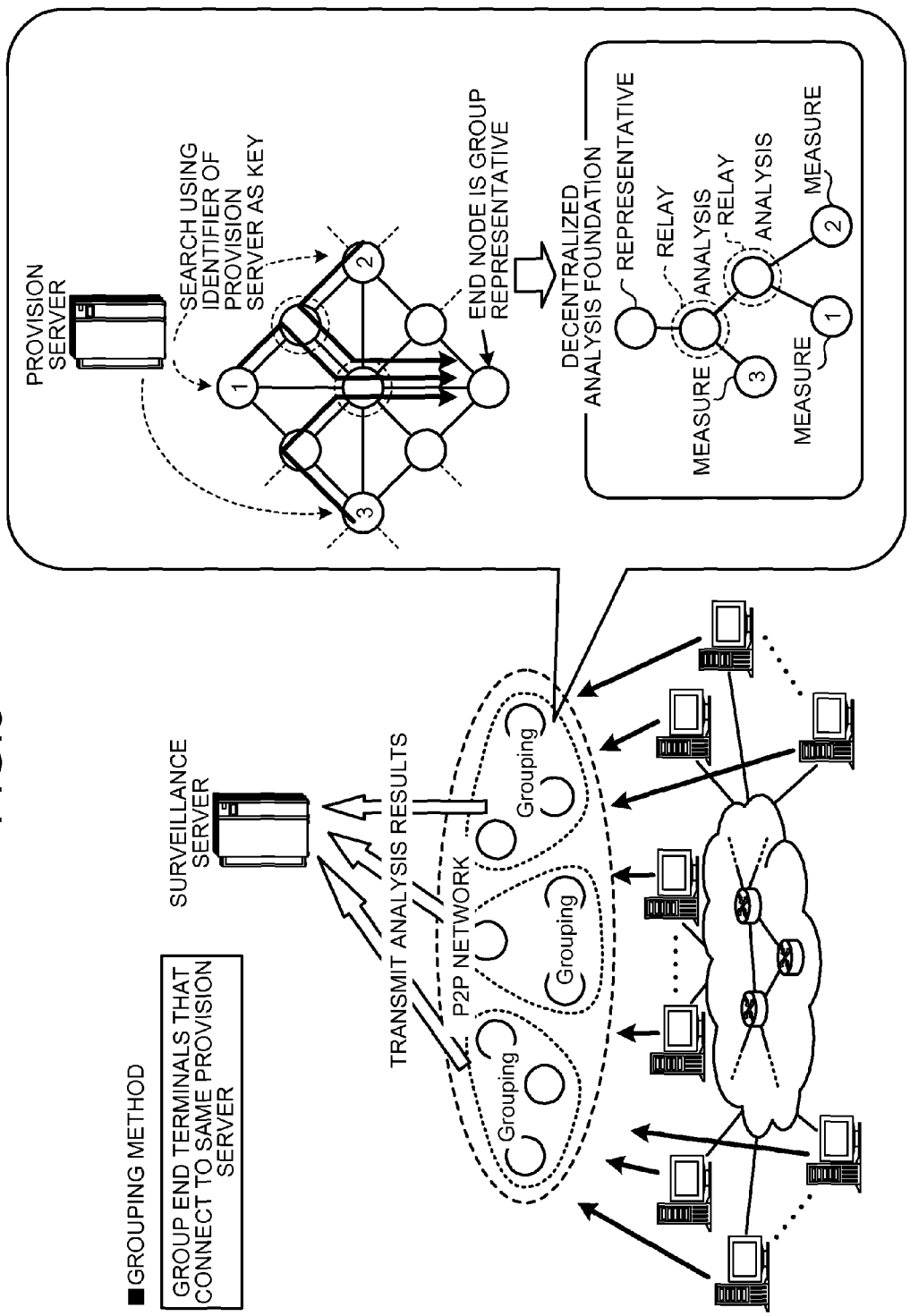
FIG. 5 is a schematic diagram illustrating a grouping function using P2P.

The grouping functional unit 12b assembles a group of the measurement agents 10 that receive a service from the same provision server by exchanging the search message with the measurement agents 10 via the overlay-network functional unit 12a (see FIG. 5). In the course of grouping, the measurement agent recognizes its role (measure, relay, or representative) in the group. That is, as depicted in FIG. 5, the grouping functional unit 12b establishes a tree structure with the measurement agent 10, which is a destination node of the search message, as "representative" of the group at the top. To narrow down a failure location based on measurement results, the measurement agents in the group perform a decentralized analysis using this hierarchical structure.

Figure 6:
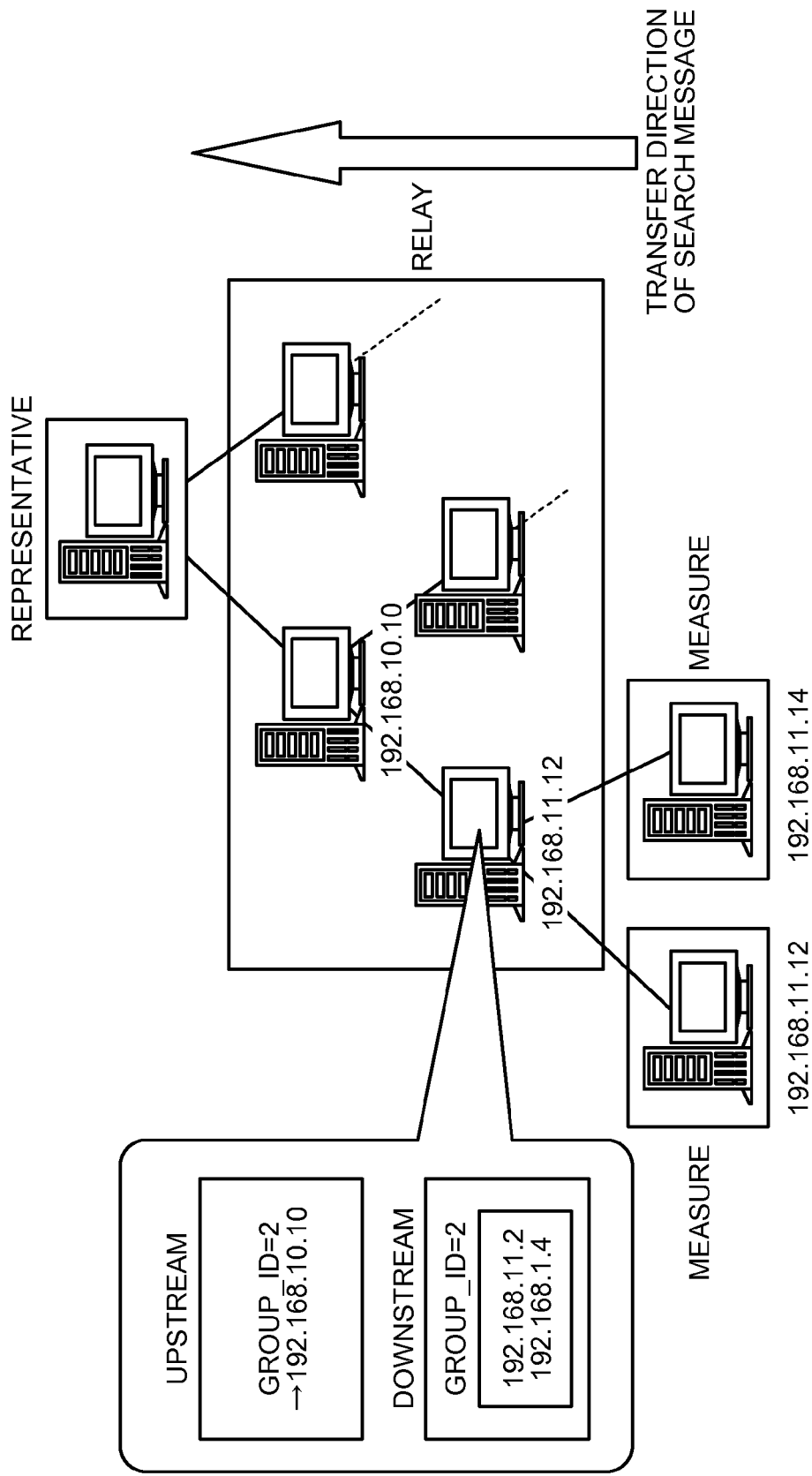
FIG. 6 is a schematic diagram illustrating a topology configured by the measurement agents.

Upon receipt of the search message, the grouping functional unit 12b notifies the grouping functional unit 12b of the search message, and the grouping functional unit 12b performs a topology configuring process. When it is assumed that a logical connection is established among the measurement agents based on relations between "upstream" and "downstream", a topology configured by the measurement agents in the same group has a hierarchical structure with the measurement agent having a role of "representative" at the top, as depicted in FIG. 6.

Specifically, the grouping functional unit 12b cooperates with the overlay-network functional unit 12a to assign a unique identifier to the measurement agent 10 and cause the measurement agent 10 to join the overlay network. The grouping functional unit 12b then assembles the measurement agents that receive the service from the same provision server among the measurement agents that have joined the overlay network, to cause the measurement agents to belong to the same group. At this time, information exchange among the measurement agents via the overlay network is performed in cooperation with the overlay-network functional unit 12a.

The grouping functional unit 12b then performs a process of recognizing (determining) a role (measure, relay, or representative) of the measurement agent in each group. By working together with the overlay-network functional unit 12a, the grouping functional unit 12b determines the role based on the course of the information exchange among the measurement agents. The grouping functional unit 12b performs a process of configuring a topology of the measurement agents in the group by establishing a virtual link with the measurement agents. Each of other measurement agents also determines the measurement agents that establish a link, based on result of the information exchange among the measurement agents.

The process of recognizing (determining) the role (measure, relay, or representative) of the measurement agent, performed by the grouping functional unit 12b, is explained. The grouping functional unit 12b determines whether an identifier of the provision server that currently provides the service to the measurement agent has been obtained from a packet. That is, the grouping functional unit 12b determines whether the subject measurement agent 10 is monitoring the packet from the provision server.

When the identifier of the provision server has been obtained, the grouping functional unit 12b notifies the overlay-network functional unit 12a of the identifier of the provision server to obtain an ID (group ID) corresponding to the provision server. The identifier of the provision server can be an IP address, a port number, or the like.

The grouping functional unit 12b then searches the group information table 11a by the group ID as a keyword. When there is a record corresponding to the group ID as a result of the search, the grouping functional unit 12b adds "measure" to the record. When "measure" is already added thereto, addition is not required. When there is no record corresponding to the group ID, the grouping functional unit 12b creates a new record and adds "measure" to the newly created record.

The grouping functional unit 12b then creates a search message and stores the group ID in the search message. The grouping functional unit 12b requests the overlay-network functional unit 12a to transmit the search message.

When the identifier of the provision server has not been obtained, the grouping functional unit 12b determines whether a search message is received from one of other measurement agents. When the search message is received from one of other measurement agents as a result of the determination, the grouping functional unit 12b obtains a group ID stored in the search message and inquires of the overlay-network functional unit 12a whether transfer of the search message is required (that is, examines whether the subject measurement agent itself manages the group ID).

When the transfer of the search message is still required as a result of the inquiry, the grouping functional unit 12b searches the group information table 11a by the group ID as a keyword. When there is a record corresponding to the group ID, the grouping functional unit 12b adds "relay" to the record. When "relay" is already added thereto, addition is not required.

When there is no record corresponding to the group ID, the grouping functional unit 12b creates a new record and adds "relay" to the newly created record. The grouping functional unit 12b then requests the overlay-network functional unit 12a to transmit the search message. The overlay-network functional unit 12a then transmits the search message to the subsequent measurement agent according to the message transfer method applied to the overlay network.

As a result of the inquiry of the overlay-network functional unit 12a whether the transfer of the search message is required, when the transfer of the search message is not required (when the subject measurement agent itself manages the group ID stored in the search message), the grouping functional unit 12b searches the group information table 11a by the group ID as a keyword.

When there is a record corresponding to the group ID as a result of the search, the grouping functional unit 12b adds "representative" to the record. When "representative" is already added thereto, addition is not required. When there is no record corresponding to the group ID, the grouping functional unit 12b creates a new record and adds "representative" to the newly created record.

The grouping functional unit 12b then creates a representative notifying message and stores its identifier in the message. The grouping functional unit 12b transmits the created representative notifying message to the surveillance server 20. When it is unnecessary that the surveillance server 20 knows the measurement agent that transmits the measurement results, the grouping functional unit 12b has no need to perform the creation and transmission of the representative notifying message and to notify the surveillance server 20 that the subject measurement agent itself is a representative.

The measurement results generated by the measurement agents 10 having the role of "measure" are transmitted to the measurement agent having the role of "representative" along transfer paths for the search message. The measurement agents that transfer the measurement results not only transfer the measurement results but also narrow down a failure location based on the measurement results (explained in detail later). The role of the measurement agent that narrows down the failure location and then transfers the measurement results to the subsequent measurement agents is referred to as "relay". In many cases, the measurement results are transmitted from a plurality of the measurement agents having the role of "measure" to the measurement agent having the role of "relay". The measurement agent having the role of "representative" collects candidates of the failure location narrowed down by the measurement agents having the role of "relay" and reports to the surveillance server 20.

The topology configuring process performed by the grouping functional unit 12b is explained. It is assumed that when the measurement agent 10 receives search messages from other measurement agents, a process explained below is performed at a stage of transfer of the search message from the overlay-network functional unit 12a to the grouping functional unit 12b. When the measurement agent 10 transmits a search message to one of other measurement agents, the process can be performed at a stage of transfer of the search message from the grouping functional unit 12b to the overlay-network functional unit 12a.

The grouping functional unit 12b first obtains the group ID stored in the search message, which is received from the overlay-network functional unit 12a. The grouping functional unit 12b then searches the group information table 11a by the obtained group ID as a keyword. As a result, when there is no record having the same group ID, the grouping functional unit 12b creates a new record.

The grouping functional unit 12b stores an identifier of the measurement agent that has transmitted the search message thereto in the item "downstream" of the record. Because the search message is often received from a plurality of the measurement agents 10, identifiers of the plural measurement agents 10 are stored in the item "downstream".

The grouping functional unit 12b then searches the group information table 11a by the group ID as a keyword, and recognizes its role in a group corresponding to the group ID to determine whether the role is "relay". As a result, when the role is not "relay", the grouping functional unit 12b does not perform following processes.

When the role is "relay", the grouping functional unit 12b determines whether an identifier of the measurement agent 10 is stored in the item "upstream" of the record. When no identifier of the measurement agent 10 is stored in the item "upstream" of the record, the grouping functional unit 12b obtains an identifier of the measurement agent 10 as a transmission destination of the search message from the overlay-network functional unit 12a and stores the identifier in the item "upstream". When the measurement agent has the role of "measure", the grouping functional unit 12b creates a search message and then performs only addition to the item "upstream".

In the overlay network applied with the present invention, when a plurality of the search messages related to the same group ID reach the same measurement agent, the measurement agent transfers all of the search messages to the same measurement agent. Accordingly, one group ID always has one "upstream". When it is assumed that a logical connection is established among the measurement agents based on relations between "upstream" and "downstream", a topology configured by the measurement agents in the same group has a hierarchical structure with the measurement agent having the role of "representative" at the top.

When the measurement agents in the group narrow down the failure location based on the measurement results, a decentralized analysis using the hierarchical structure is performed. In this way, other than Chord, any overlay network in which a hierarchical structure can be configured as a result of grouping based on the transfer of the search messages can be applied.

The measurement-information receiving unit 12c receives the measurement results from other measurement agents, and stores the measurement results in the measurement information database 11b with the group IDs as keywords.

The measuring unit 12d measures qualities of the services provided by the provision servers. Specifically, the measuring unit 12d sets a measurement time counter at zero upon receipt of a "calculation interval of the measurement results" (for example, 10 seconds) as a configuration parameter from a user, and then starts measuring the qualities of the services provided by the provision servers.

The measuring unit 12d derives a measurement result based on information related to a network status obtained when the measurement time counter reaches 10 seconds as the "calculation interval of the measurement results" or more seconds, and stores the measurement result in the measurement information database 11b. The measuring unit 12d then sets the measurement time counter at zero again.

The process of obtaining the measurement information is explained in detail. When the measurement time counter reaches 10 seconds as the calculation interval of the measurement results or more seconds, the measuring unit 12d measures information of routers that relay the service transmitted from the provision server to the measurement agent 10 (a set of information that enables to uniquely identify the routers such as IP addresses. Hereinafter, "path"). A method that uses traceroute to check a path by transmitting measurement packets from the measurement agents 10, or a method that enables to check a path by obtaining Simple Network Management Protocol (SNMP) information of routers or switches can be applied as the measurement method.

The measuring unit 12d then sets a "path" between the provision server and the measurement agent as the measurement result in the "path", which is one element of the measurement result. The measuring unit 12d then calculates a packet loss rate based on statistical information obtained from packets related to the received service. Information related to the quality of the received service such as fluctuation of the packet arrival interval or the reception rate of the service (for example, data amount per second) can be utilized.

The measuring unit 12d then compares the calculated packet loss rate and a threshold for the measurement results previously set, and determines a "reception quality" which is one element of the measurement result. In this example, the measuring unit 12d sets the reception quality to "NG" which indicates no good when the packet loss rate of the measurement result exceeds "1%", which is the "threshold for the measurement results", and otherwise sets the reception quality to "OK" which indicates good. The measuring unit 12d can compare information other than the packet loss rate and the "threshold for the measurement results" to determine the reception quality.

The measuring unit 12d then searches the measurement information database 11b by the group ID as a keyword. When there is no record corresponding to the group ID, the measuring unit 12d creates a new record and stores the measurement result (a pair of the reception quality and the path) in the record. Additional information such as a calculation time for the measurement result can be stored together.

When there is a record corresponding to the group ID, the measuring unit 12d updates the measurement result (the pair of the reception quality and the path) in the record. At that time, the additional information can be updated together.

The measurement-information analyzing unit 12e narrows down candidates of the failure location based on the received measurement results. Specifically, the measurement-information analyzing unit 12e sets a reading counter at zero upon receipt of a "reading interval of the measurement results" (for example, 10 seconds) and a "threshold for the measurement results" (for example, the packet loss rate of 1%) as configuration parameters from the user. The "threshold for the measurement results" is not limited to the packet loss rate. Any information related to the quality of the received service such as the fluctuation of the packet arrival interval can be applied.

The measurement-information analyzing unit 12e reads the measurement result from the measurement information database 11b when the reading time counter reaches 10 seconds as the "reading interval of the measurement results" or more seconds, and performs a process corresponding to its role (measure, relay, or representative). The measurement-information analyzing unit 12e then sets the reading time counter at zero again.

As the process corresponding to its role (measure, relay, or representative), the measurement-information analyzing unit 12e reads measurement information related to a group to which it belongs as the measurement agent 10 having the role of "relay", from the measurement information database 11b, narrows down the failure location, and notifies the measurement-information transmitting unit 12f of a request to transmit an obtained result to one of other measurement agents.

The measurement-information analyzing unit 12e reads measurement information related to a group to which it belongs as the measurement agent 10 having the role of "representative", from the measurement information database 11b, narrows down the failure location, and notifies the measurement-information transmitting unit 12f of a request to transmit an obtained result to the surveillance server 20.

The processes of narrowing down the failure location performed when the measurement agent has the roles of "relay" or "representative" are explained in detail. The measurement-information analyzing unit 12e searches the group information table 11a by the "role" as a keyword, and recognizes a group ID corresponding to a group in which the role of the measurement agent is "relay" or "representative". In this condition, the measurement-information analyzing unit 12e searches the measurement information database 11b by the group ID as a keyword. When there is no record corresponding to the group ID, following processes are not performed. When there is a record corresponding to the group ID, the measurement-information analyzing unit 12e reads all the measurement information corresponding to the group ID.

The measurement-information analyzing unit 12e extracts based on the obtained measurement results, parts of the paths included in the measurement results, which are candidates of the failure location and sets the extracted candidates of the failure location in the "path" as one element of the measurement result.

In an exemplary method for extracting parts of the path as the candidates of the failure location, the measurement-information analyzing unit 12e creates a table of correspondences between the "reception quality" and the "path" based on the measurement results, as depicted in FIG. 7. In this example, the measurement-information analyzing unit 12e first eliminates a link (pair of identifiers of routers) included in a "path" which is included in the measurement information with the "reception quality" of OK from the correspondence table. The measurement-information analyzing unit 12e then extracts "links" included in all the measurement results with the "reception quality" of NG from the remaining "links" as candidates of the failure location. Not only the method above described, any measures that enable to extract the candidates of the failure location can be applied.

When no candidate of the failure location remains, the measurement-information analyzing unit 12e does not perform following processes. When there is a candidate of the failure location, the measurement-information analyzing unit 12e sets the "reception quality" as one element of the measurement result to NG and transfers the measurement result to the measurement-information transmitting unit 12f.

The measurement-information transmitting unit 12f transmits the measurement information to one of other measurement agents or the surveillance server 20. Specifically, the measurement-information transmitting unit 12f receives the "identifier of the surveillance server" (for example, "192.168.1.1") as a configuration parameter from the user. The "identifier of the surveillance server" is not limited to the IP address, and any value that enables to uniquely identify the surveillance server such as a port number can be used. In addition, the "identifier of the surveillance server" can be notified by the surveillance server or other measurement agents, not by the user of the computer.

When the reading time counter reaches 10 seconds which is the reading interval of the measurement results or more seconds, the measurement-information transmitting unit 12f reads from the measurement information database 11b, measurement information related to a group to which it belongs as the measurement agent having the role of "measure", and transmits the read measurement information to one of other measurement agents.

Upon receipt of the request from the measurement-information analyzing unit 12e to transmit the narrowed result of the failure location to one of other measurement agents or the surveillance server 20, the measurement-information transmitting unit 12f transmits the narrowed result of the failure location to the measurement agent or the surveillance server 20.

When the reading time counter reaches 10 seconds, which is the reading interval of the measurement results, or more seconds, the measurement-information transmitting unit 12f searches the group information table 11a by "role" as a keyword and recognizes a group ID corresponding to a group in which the role of the measurement agent is "measure". The measurement-information transmitting unit 12f then searches the measurement information database 11b by the group ID as a keyword. When there is no record corresponding to the group ID, the measurement-information transmitting unit 12f does not perform following processes. When there is a record corresponding to the group ID, the measurement-information transmitting unit 12f reads the measurement information.

The measurement-information transmitting unit 12f searches the group information table 11a by the group ID as a keyword to obtain the IP address and the port number of a "upstream" measurement agent as a transmission destination of the measurement result. The measurement-information transmitting unit 12f transmits the measurement result to the "upstream" measurement agent.

Configuration of Surveillance Server

A configuration of the surveillance server 20 depicted in FIG. 1 is explained with reference to FIG. 8. FIG. 8 is a block diagram of a configuration of the surveillance server 20 according to the first embodiment. As depicted in FIG. 8, the surveillance server 20 includes a measurement information database 21a, an analysis result database 21b, a measurement-information receiving unit 22a, a measurement-information analyzing unit 22b, and a failure-location publicizing unit 22c. Processes performed by these units are explained below.

The measurement information database 21a stores therein the measurement results received by the measurement-information receiving unit 22a (explained later) from the representative measurement agent 10. Specifically, the measurement information database 21a stores therein "paths" having the "reception quality" of NG.

Figures 10, 11:
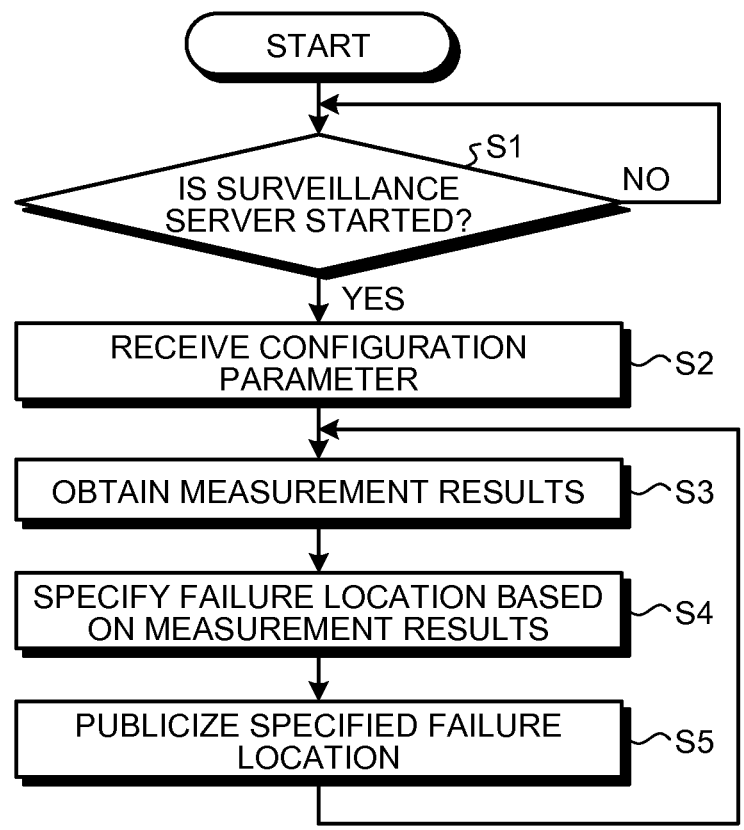
FIG. 10 is a schematic diagram illustrating an analysis result database.
FIG. 11 is a flowchart of a general processing operation of the surveillance server according to the first embodiment.

The analysis result database 21b stores therein results of analyses performed by the measurement-information analyzing unit 22b (explained later). Specifically, the analysis result database 21b stores therein results specified as the failure location from the extracted candidates of the failure location, as depicted in FIG. 10.

The measurement-information receiving unit 22a receives the measurement results from the representative measurement agent 10. Specifically, the measurement-information receiving unit 22a starts receiving the measurement results from the measurement agents 10 according to an activate request from the administrator, and receives the measurement results from the representative measurement agent 10.

The measurement-information analyzing unit 22b specifies the failure location from among the paths included in the measurement results. Specifically, upon start-up of the surveillance server 20, the measurement-information analyzing unit 22b receives information of the "reading interval of the measurement results" from the administrator. For example, the measurement-information analyzing unit 22b receives "10 (seconds)" as the reading interval of the measurement results. The "reading interval of the measurement results" can be inputted as an argument by the administrator at start-up, or read from a configuration file or the like.

The measurement-information analyzing unit 22b then sets the time counter at zero and notifies the measurement-information receiving unit 22a of starting waiting for reception of the measurement results from the measurement agents. It is assumed that the time counter is incremented at regular intervals. For example, the time counter is incremented by one "every second".

The measurement-information analyzing unit 22b reads the measurement results received from the measurement information database 21a when the time counter exceeds 10, which is the reading interval of the measurement results. The measurement-information analyzing unit 22b then updates the time counter with zero when the reading is completed. The measurement-information analyzing unit 22b then performs an analyzing process for specifying the failure location based on the read measurement results, and stores an obtained result in the analysis result database 21b.

At this time, the measurement-information analyzing unit 22b specifies the failure location from among the paths included in the measurement results, as the analyzing process for specifying the failure location. That is, the measurement-information analyzing unit 22b specifies a portion as the failure location from among the paths having the reception quality of NG and being narrowed down by the "relay" and "representative" measurement agents 10. Any method can be applied as a method of specifying portions as the candidates of the failure location. For example, all links included in the paths with the reception quality of NG can be specified as the failure location.

The failure-location publicizing unit 22c publicizes a result of the specification of the failure location to various network entities (all entities that can use information related to the failure location, such as routers, computers, and the measurement agents). Specifically, the failure-location publicizing unit 22c opens connecting interface according to an activate request from the administrator.

The failure-location publicizing unit 22c then reads the analysis result from the analysis result database 21b according to a request from the network entities, and publicizes the specified failure location to the network entities. The surveillance server is possible to periodically report the analysis result to the measurement agents whose IP addresses and port numbers are previously known or publicize the analysis result on a website.

Process by Network Failure Detecting System

Figure 12:
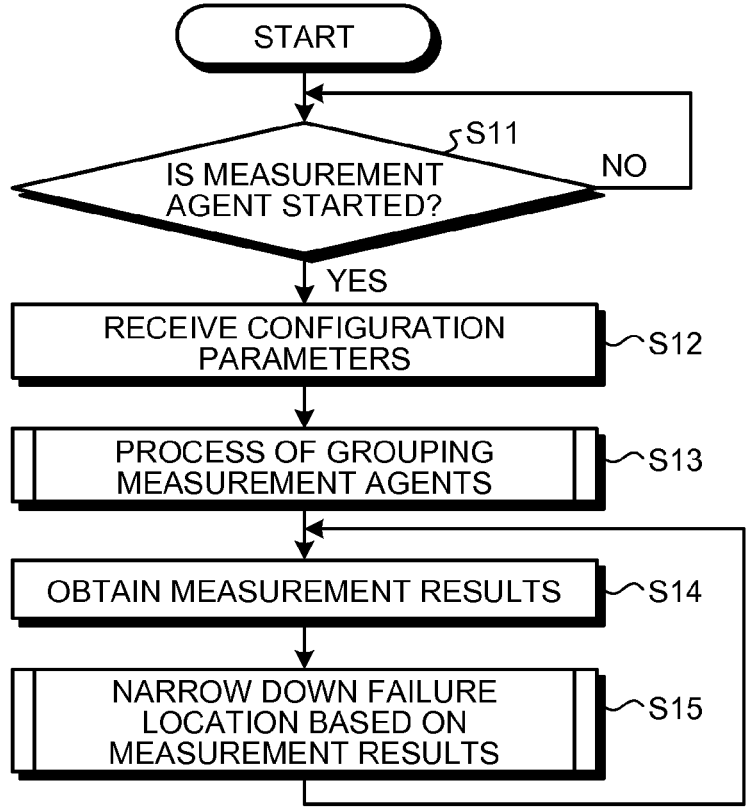
FIG. 12 is a flowchart of a general processing operation of the measurement agent according to the first embodiment.
Figure 21:
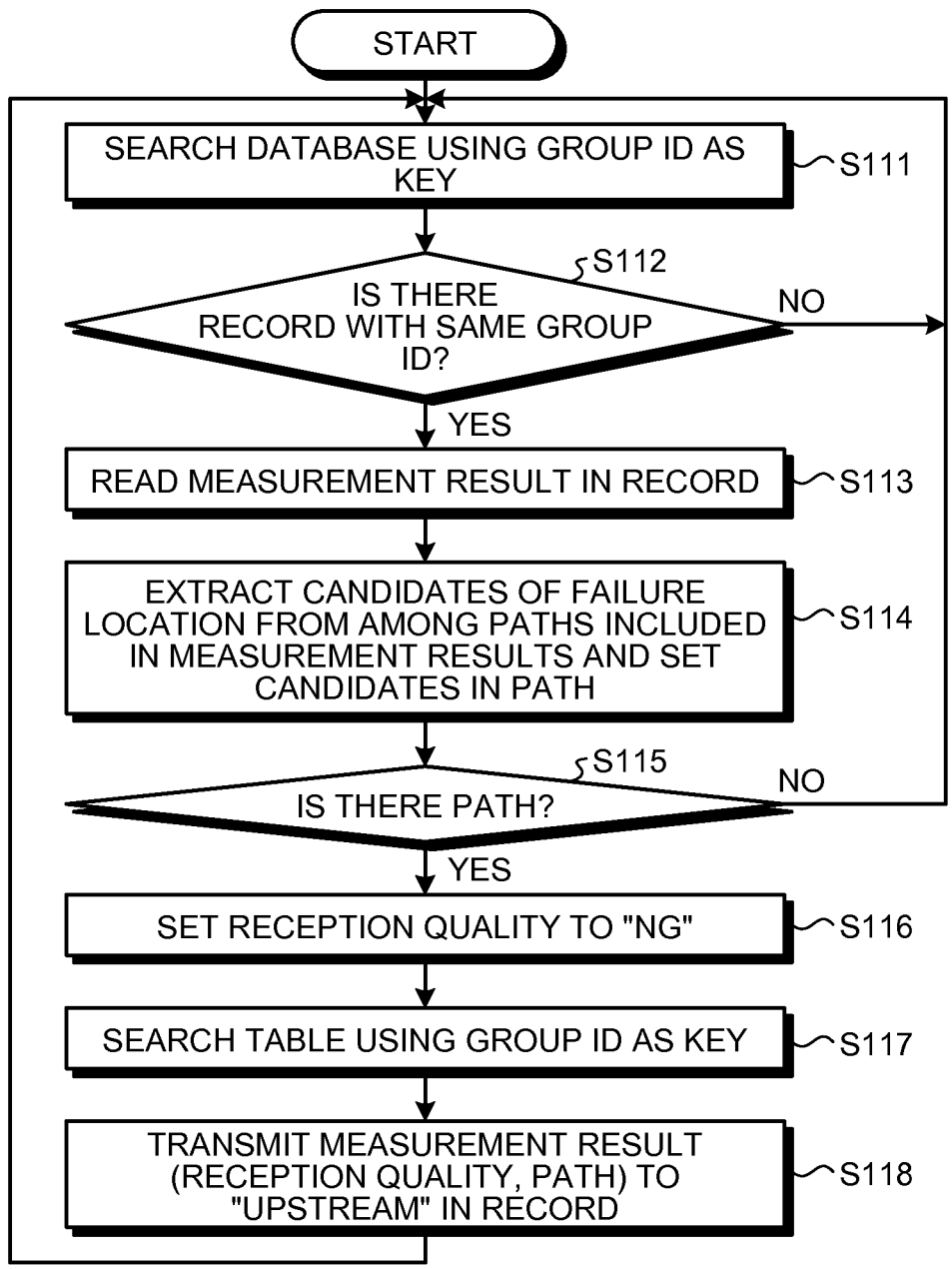
FIG. 21 is a flowchart of a narrowed-result transmitting process when a role of the measurement agent is relay.
Figure 22:
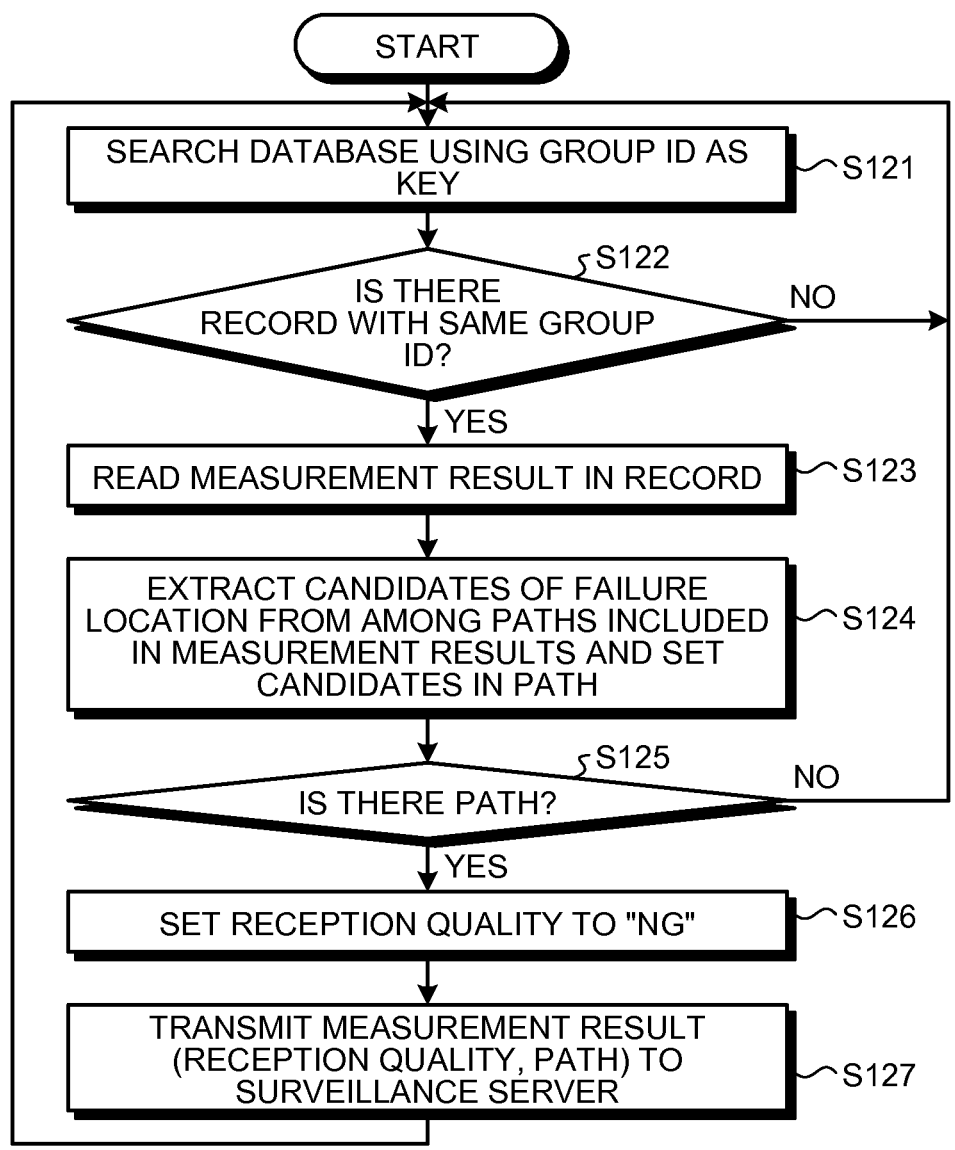
FIG. 22 is a flowchart of a narrowed-result transmitting process when a role of the measurement agent is representative.
Figure 23:
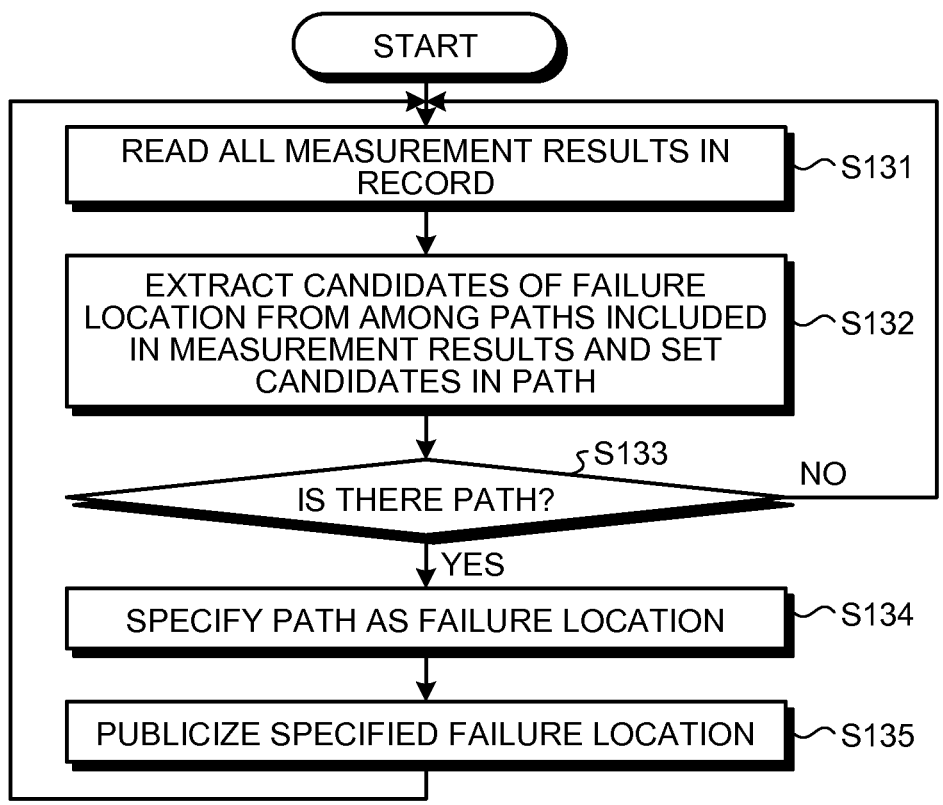
FIG. 23 is a flowchart of a detailed processing operation of the surveillance server according to the first embodiment after measurement results are obtained.

Processes performed by the surveillance server and the measurement agent in the network failure detecting system according to the first embodiment are explained with reference to FIGS. 11 to 23. FIG. 11 is a flowchart of a general processing operation of the surveillance server according to the first embodiment, FIG. 12 is a flowchart of a general processing operation of the measurement agent according to the first embodiment, FIGS. 13 to 22 are flowchart of a detailed process performed by the measurement agent according to the first embodiment, and FIG. 23 is a flowchart of a detailed processing operation of the surveillance server according to the first embodiment after the measurement results are obtained.

First, a processing operation of the surveillance server according to the first embodiment is explained with reference to FIG. 11. When started up upon receipt of an activate request from the administrator (YES at Step S1), the surveillance server 20 receives the "reading interval of the measurement results" as a configuration parameter from the administrator (Step S2).

When the time counter exceeds 10, which is the reading interval of the measurement results, the surveillance server 20 reads the measurement results received from the measurement agents 10, from the measurement information database 21a (Step S3).

The surveillance server 20 then specifies the failure location by performing the analyzing process based on the read information, and stores an obtained result in the analysis result database 21b (Step S4). The surveillance server 20 reads the analysis result from the analysis result database 21b according to a request from a network entity, and publicizes the specified failure location to the network entity (Step S5).

A general process performed by the measurement agent according to the first embodiment is explained with reference to FIG. 12. When software of the measurement agent 10 is started in conjunction of start of a service receiving application by a user of a computer (YES at Step S11), the measurement agent 10 receives from the user, the information of the "calculation interval of the measurement results", the "reading interval of the measurement results", the "threshold for the measurement results", and the "identifier of the surveillance server" as configuration parameters (Step S12). The information can be inputted as arguments by the user of the computer at the start-up, or read from the configuration file.

The measurement agent 10 establishes a virtual link with some measurement agents that have performed processing for join the overlay network and already joined the overlay network, and exchanges search messages with the measurement agents 10, thereby performing a process of grouping the measurement agents 10 that receive the service from the same provision server (explained in detail below with reference to FIG. 13) (Step S13).

The measurement agent 10 then obtains the measurement results stored in the measurement information database 11b (Step S14), and performs a process of narrowing down a failure location based on the measurement results according to its role (measure, relay, or representative) (explained in detail below with reference to FIG. 18) (Step S15).

Figure 13:
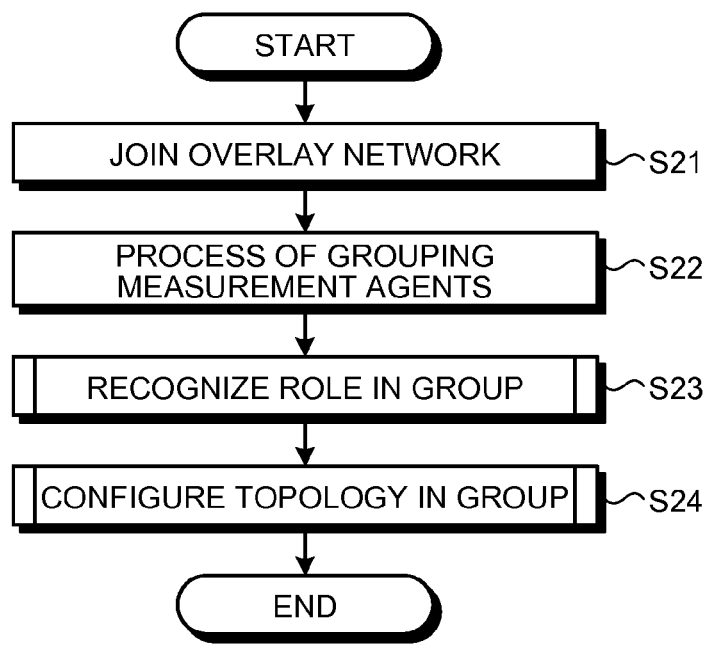
FIG. 13 is a flowchart of a grouping process performed by the measurement agent according to the first embodiment.

The grouping process performed by the measurement agent according to the first embodiment is explained with reference to FIG. 13. FIG. 13 is a flowchart of a grouping process performed by the measurement agent according to the first embodiment.

As depicted in FIG. 13, the grouping functional unit 12b of the measurement agent 10 assigns a unique identifier to the measurement agent 10 in cooperation with the overlay-network functional unit 12a, and causes the measurement agent 10 to join the overlay network (Step S21). The grouping functional unit 12b assembles the measurement agents that receive the service from the same provision server, out of other measurement agents joining the overlay network, to belong to the same group (Step S22).

The grouping functional unit 12b then performs a process of recognizing the role (measure, relay, or representative) of the measurement agent in each group (explained in detail below with reference to FIGS. 14 to 16) (Step S23). The grouping functional unit 12b then establishes a virtual link among the measurement agents, thereby performing a process of configuring a topology of the measurement agents in the group (explained in detail below with reference to FIG. 17) (Step S24).

Figure 14:
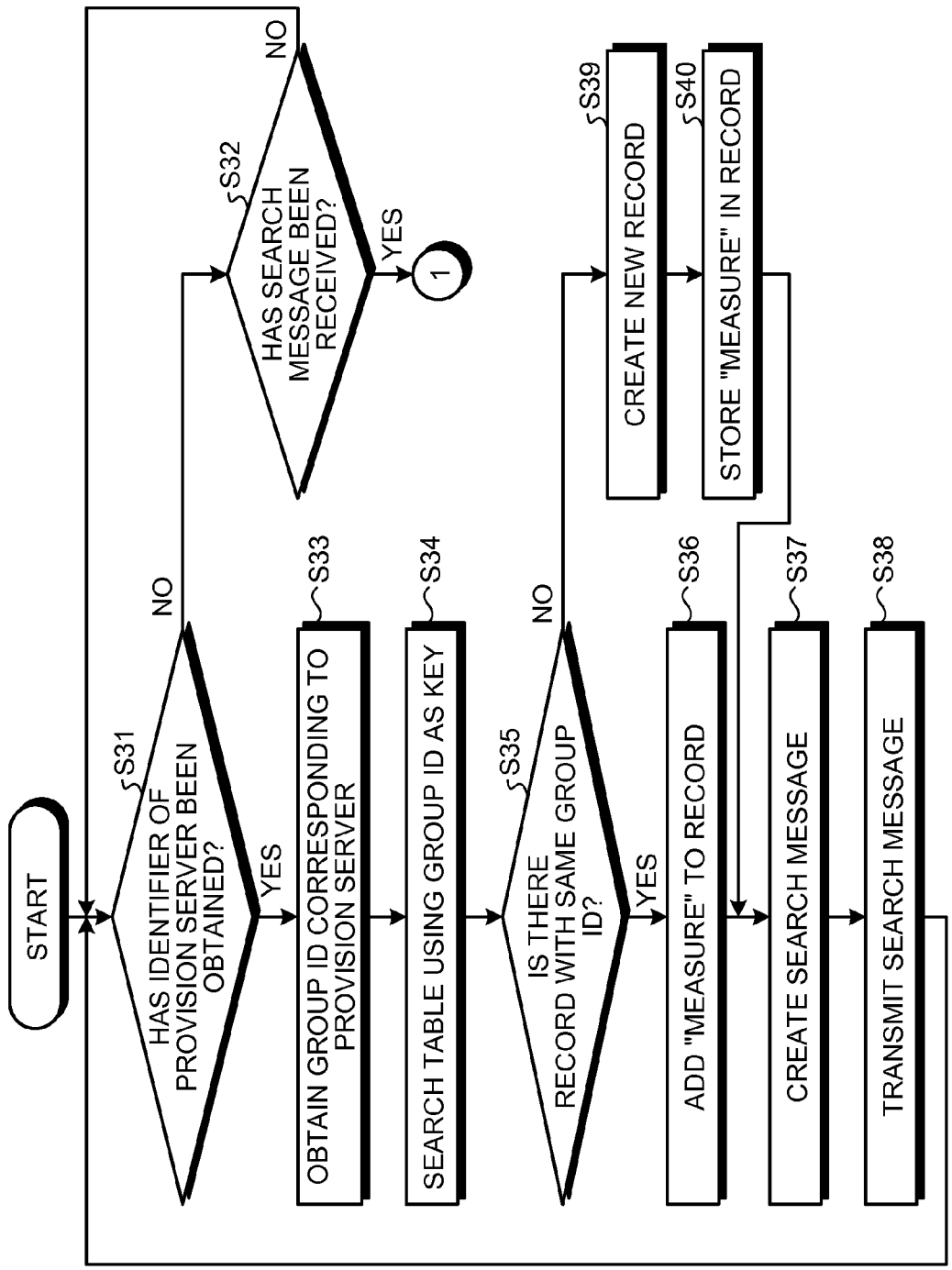
FIG. 14 is a flowchart of a process of recognizing a role in a group performed by the measurement agent according to the first embodiment.
Figure 15:
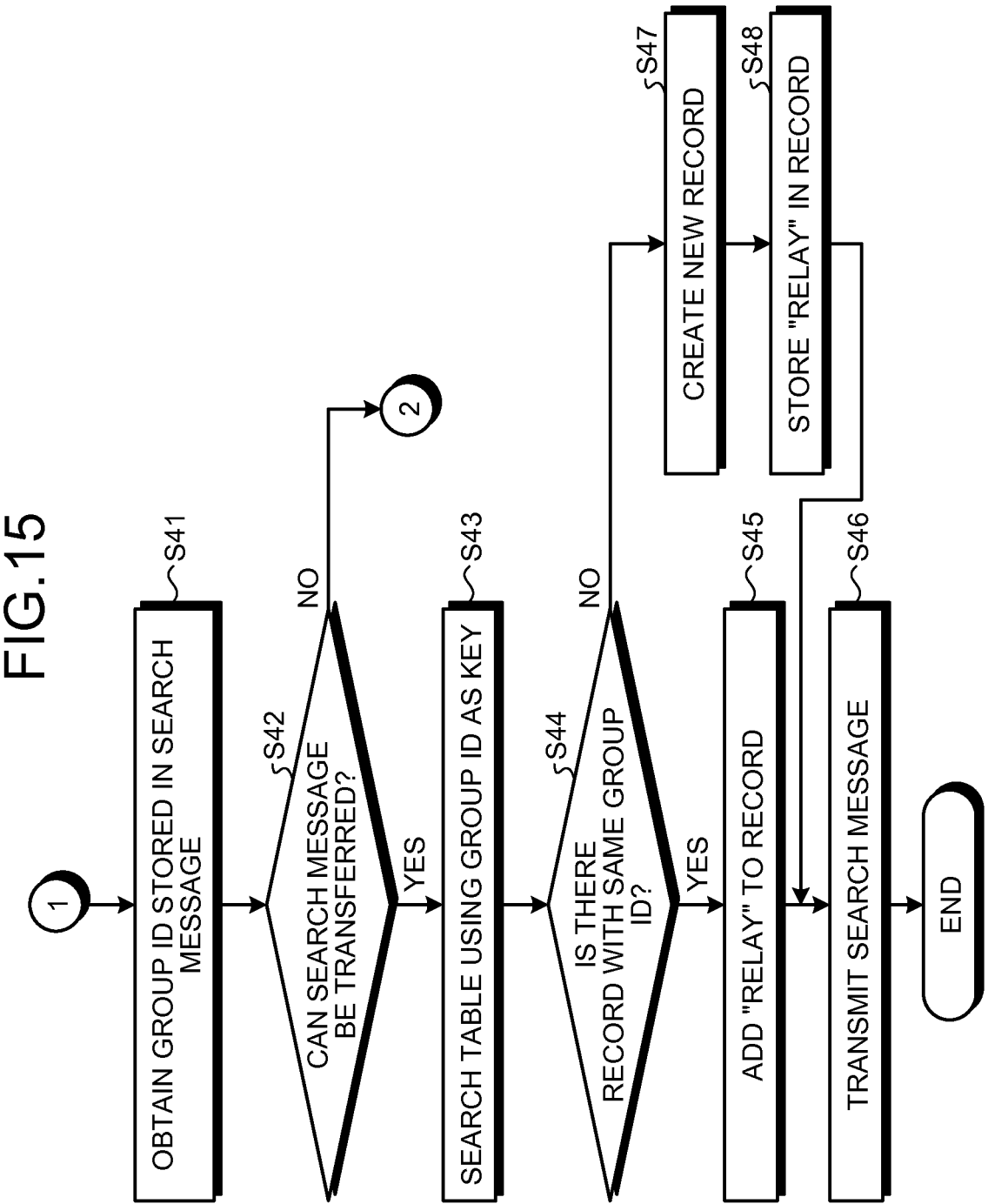
FIG. 15 is a flowchart of another process of recognizing a role in a group performed by the measurement agent according to the first embodiment.
Figure 16:
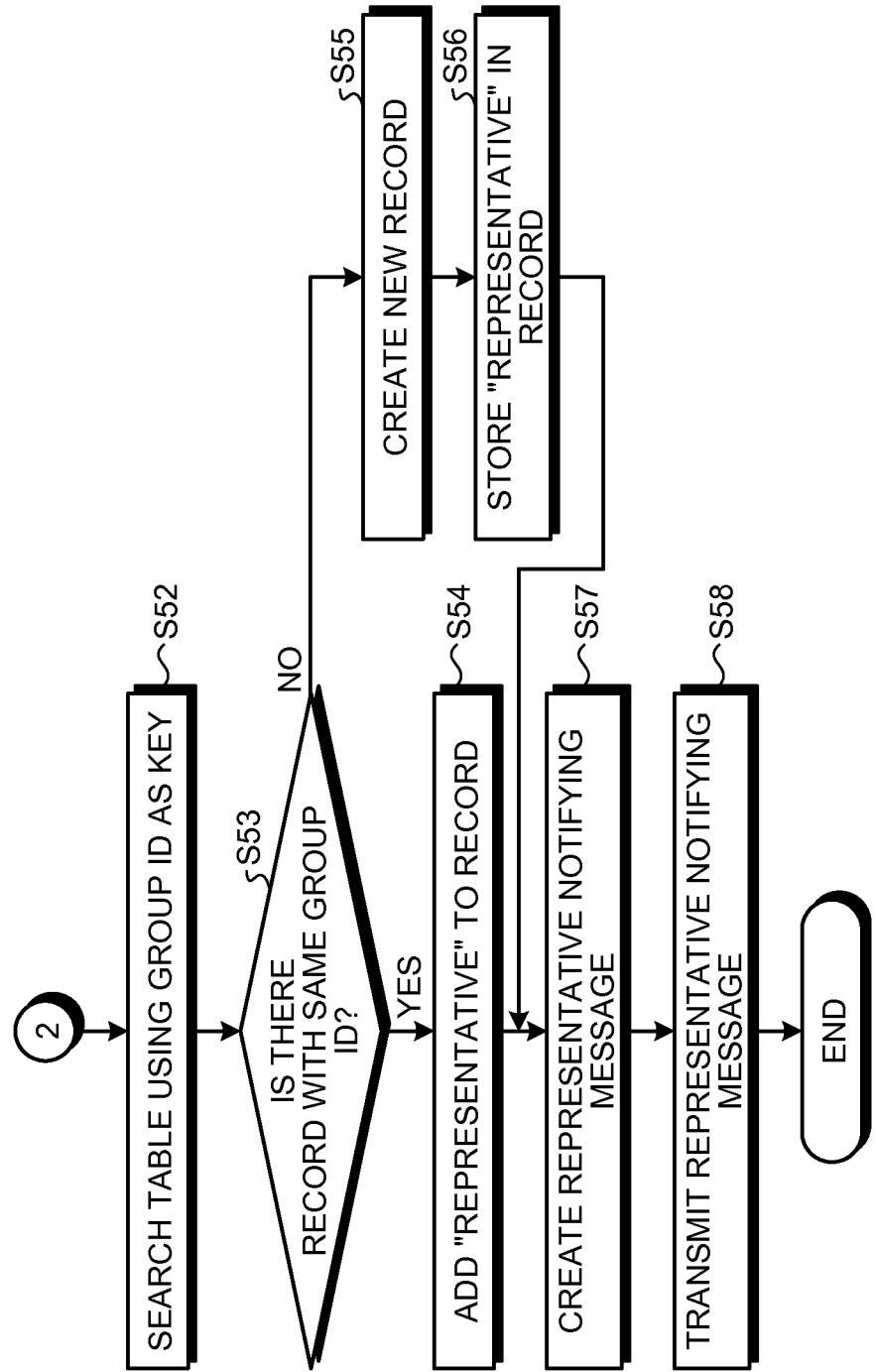
FIG. 16 is a flowchart of still another process of recognizing a role in a group performed by the measurement agent according to the first embodiment.

The process of recognizing the role in each group performed by the measurement agent according to the first embodiment is explained with reference to FIGS. 14 to 16. FIGS. 14 to 16 are flowcharts of the process of recognizing the role in each group performed by the measurement agent according to the first embodiment.

As depicted in FIG. 14, the grouping functional unit 12b of the measurement agent 10 determines whether the identifier of the provision server that is currently providing the service to the measurement agent has been obtained from a packet (Step S31). That is, the grouping functional unit 12b determines whether the subject measurement agent 10 monitors the packet from the provision server.

When having obtained the identifier of the provision server (YES at Step S31), the grouping functional unit 12b notifies the overlay-network functional unit 12a of the identifier of the provision server, and obtains an ID (group ID) corresponding to the provision server (Step S33).

The grouping functional unit 12b then searches the group information table 11a by the group ID as a keyword (Step S34). As a result of the search, when there is a record corresponding to the group ID (YES at Step S35), the grouping functional unit 12b adds "measure" to the record (Step S36). When there is no record corresponding to the group ID (NO at Step S35), the grouping functional unit 12b creates a new record (Step S39) and stores "measure" in the newly created record (Step S40).

The grouping functional unit 12b then creates a search message (Step S37), and the overlay-network functional unit 12a transmits the search message to the subsequent measurement agent (Step S38).

When the identifier of the provision server has not been obtained (NO at Step S31), the grouping functional unit 12b determines whether a search message has been received from another measurement agent (Step S32). As a result, when having received the search message from another measurement agent (YES at Step S32), the grouping functional unit 12b obtains a group ID stored in the search message (Step S41), and inquires of the overlay-network functional unit 12a whether transfer of the search message is required (Step S42), as depicted in FIG. 15.

As a result, when the transfer of the search message is still required (YES at Step S42), the grouping functional unit 12b searches the group information table 11a by the group ID as a keyword (Step S43). When there is a record corresponding to the group ID (YES at Step S44), the grouping functional unit 12b adds "relay" to the record (Step S45).

When there is no record corresponding to the group ID (No at Step S44), the grouping functional unit 12b creates a new record (Step S47), and stores "relay" in the newly created record (Step S48). The overlay-network functional unit 12a then transmits the search message to the subsequent measurement agent according to the message transfer method applied in the overlay network (Step S46).

When the transfer of the search message is not required as a result of the inquiry of the overlay-network functional unit 12a whether the transfer of the search message is required (NO at Step S42), the grouping functional unit 12b searches the group information table 11a by the group ID as a keyword (Step S52), as depicted in FIG. 16.

As a result, when there is a record corresponding to the group ID (YES at Step S53), the grouping functional unit 12b adds "representative" to the record (Step S54). When there is no record corresponding to the group ID (NO at Step S53), the grouping functional unit 12b creates a new record (Step S55), and stores "representative" in the newly created record (Step S56).

The grouping functional unit 12b then creates a representative notifying message (Step S57). The grouping functional unit 12b then transmits the created representative notifying message to the surveillance server 20 (Step S58).

Figure 17:
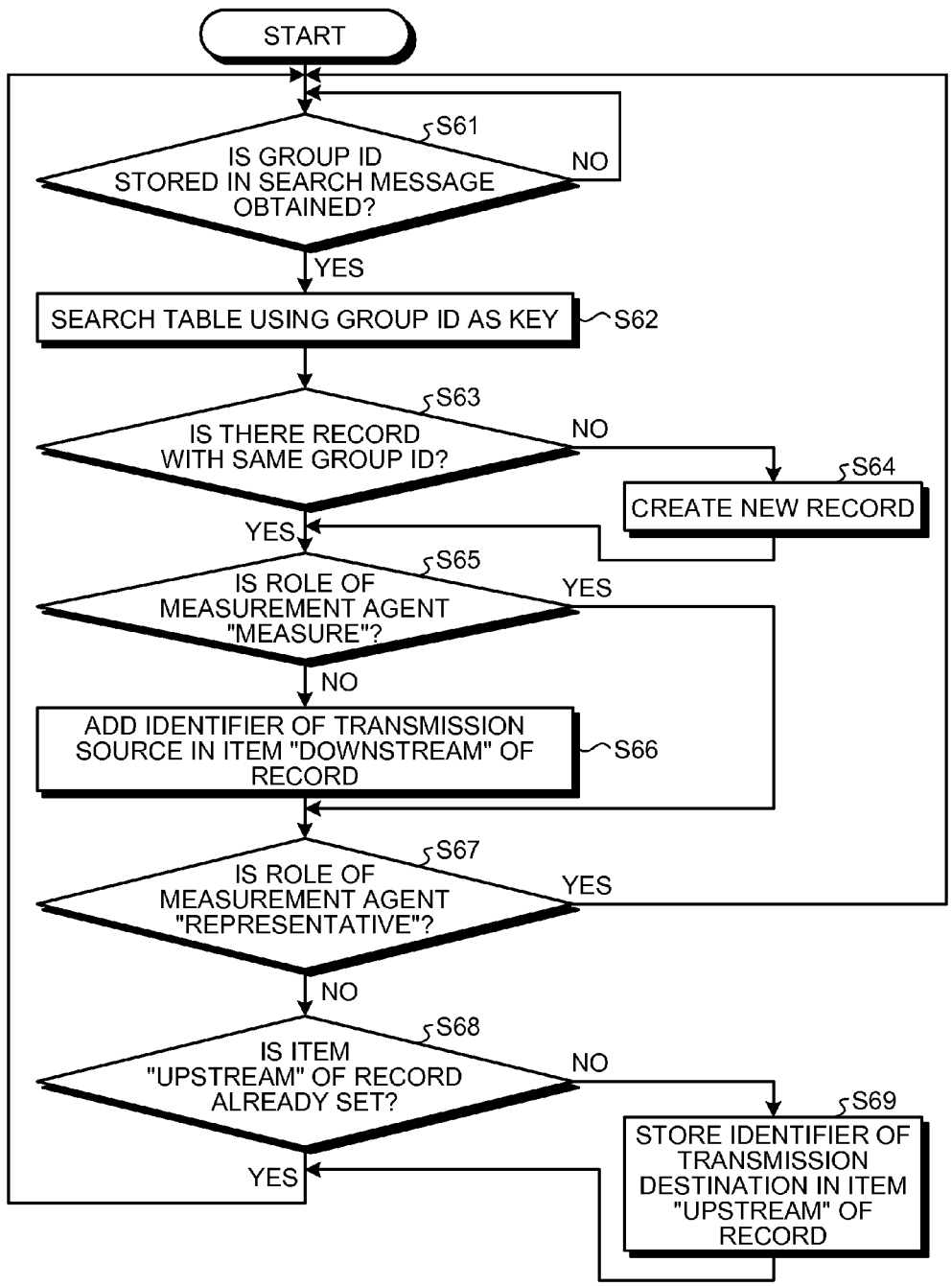
FIG. 17 is a flowchart of a process of configuring a topology in a group performed by the measurement agent according to the first embodiment.

The process of configuring a topology in a group performed by the measurement agent according to the first embodiment is explained with reference to FIG. 17. FIG. 17 is a flowchart of a process of configuring a topology in a group performed by the measurement agent according to the first embodiment.

As depicted in FIG. 17, when obtaining the group ID stored in the search message received from the overlay-network functional unit 12a (YES at Step S61), the grouping functional unit 12b of the measurement agent 10 searches the group information table 11a by the obtained group ID as a keyword (Step S62). As a result, when there is no record with the same group ID (NO at Step S63), the grouping functional unit 12b creates a new record (Step S64).

When there are records with the same group ID (YES at Step S63), the grouping functional unit 12b performs Step S65. The grouping functional unit 12b then searches the group information table 11a by the group ID as a keyword and recognizes its role in the group corresponding to the group ID, thereby determining whether the role is "measure" (Step S65). As a result, when determining that the role of the measurement agent is not "measure" (NO at Step S65), the grouping functional unit 12b adds an identifier of the measurement agent that has transmitted the search message thereto in the item "downstream" of the record (Step S66). When determining that the role of the subject measurement agent is "measure" (YES at Step S65), performs Step S67.

The grouping functional unit 12b then determines whether the role of the subject measurement agent is "representative" (Step S67). As a result, when the role of the subject measurement agent is not "representative" (NO at Step S67), the grouping functional unit 12b determines whether the identifier of the measurement agent 10 has been set in the item "upstream" of the record (Step S68). As a result, when the identifier of the measurement agent 10 has not been set in the item "upstream" of the record (NO at Step S68), the grouping functional unit 12b obtains the identifier of the measurement agent 10 as a transmission destination of the search message from the overlay-network functional unit 12a and stores the identifier in the item "upstream" (Step S69). When the role of the subject measurement agent is "representative" (YES at Step S67), or when the identifier of the measurement agent 10 has been set in the item "upstream" of the record (YES at Step S68), the grouping functional unit 12b returns to Step S61.

Figure 18:
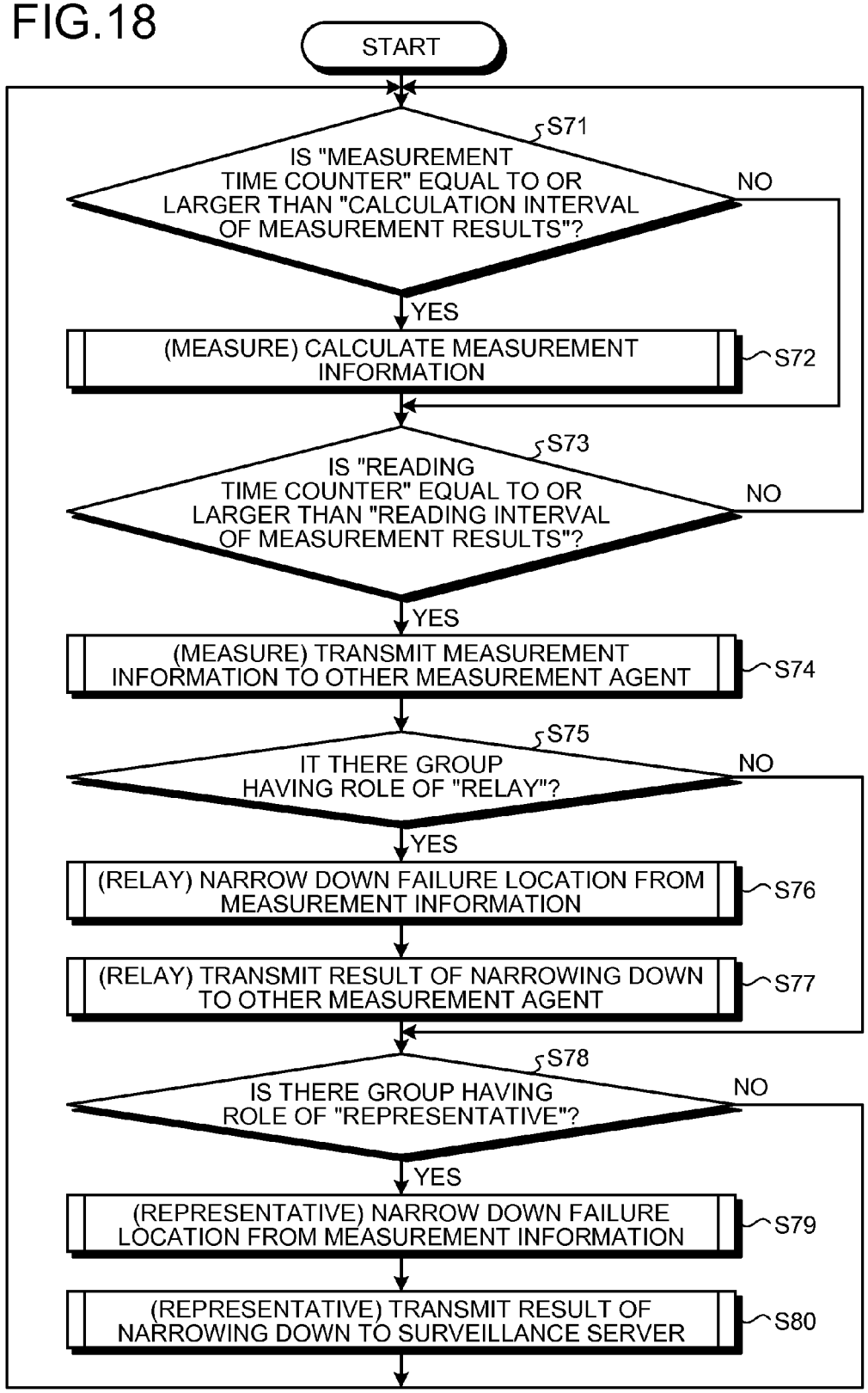
FIG. 18 is a flowchart of a failure-location narrowing process performed by the measurement agent according to the first embodiment.

The failure-location narrowing process performed by the measurement agent according to the first embodiment is explained next with reference to FIG. 18. FIG. 18 is a flowchart of a failure-location narrowing process performed by the measurement agent according to the first embodiment.

As depicted in FIG. 18, when the measurement time counter reaches 10 seconds, which is the calculation interval of the measurement results, or more seconds (YES at Step S71), the measuring unit 12d of the measurement agent 10 calculates the measurement result (explained in detail below with reference to FIG. 19), and stores the calculated result in the measurement information database 11b (Step S72). When the reading time counter reaches 10 seconds, which is the reading interval of the measurement results, or more seconds (YES at Step pS73), the measurement-information transmitting unit 12f reads from the measurement information database 11b, the measurement information related to a group to which the subject measurement agent 10 belong as the measurement agent having the role of "measure", and performs a process of transmitting the information to one of other measurement agents (explained in detail below with reference to FIG. 20) (Step S74).

When the subject measurement agent 10 has the role of "relay" (YES at Step S75), the measurement-information analyzing unit 12e reads from the measurement information database 11b, the measurement information related to a group to which the measurement agent 10 belongs and narrows down a failure location (Step S76). The measurement-information transmitting unit 12f then performs a process of transmitting an obtained result to one of other measurement agents (explained in detail below with reference to FIG. 21) (Step S77).

When the subject measurement agent 10 has the role of "representative" (YES at Step S78), the measurement-information analyzing unit 12e reads from the measurement information database 11b, the measurement information related to a group to which the measurement agent 10 belongs and narrows down the failure location (Step S79). The measurement-information transmitting unit 12f then performs a process of transmitting an obtained result to the surveillance server 20 (explained in detail below with reference to FIG. 22) (Step S80).

Figure 19:
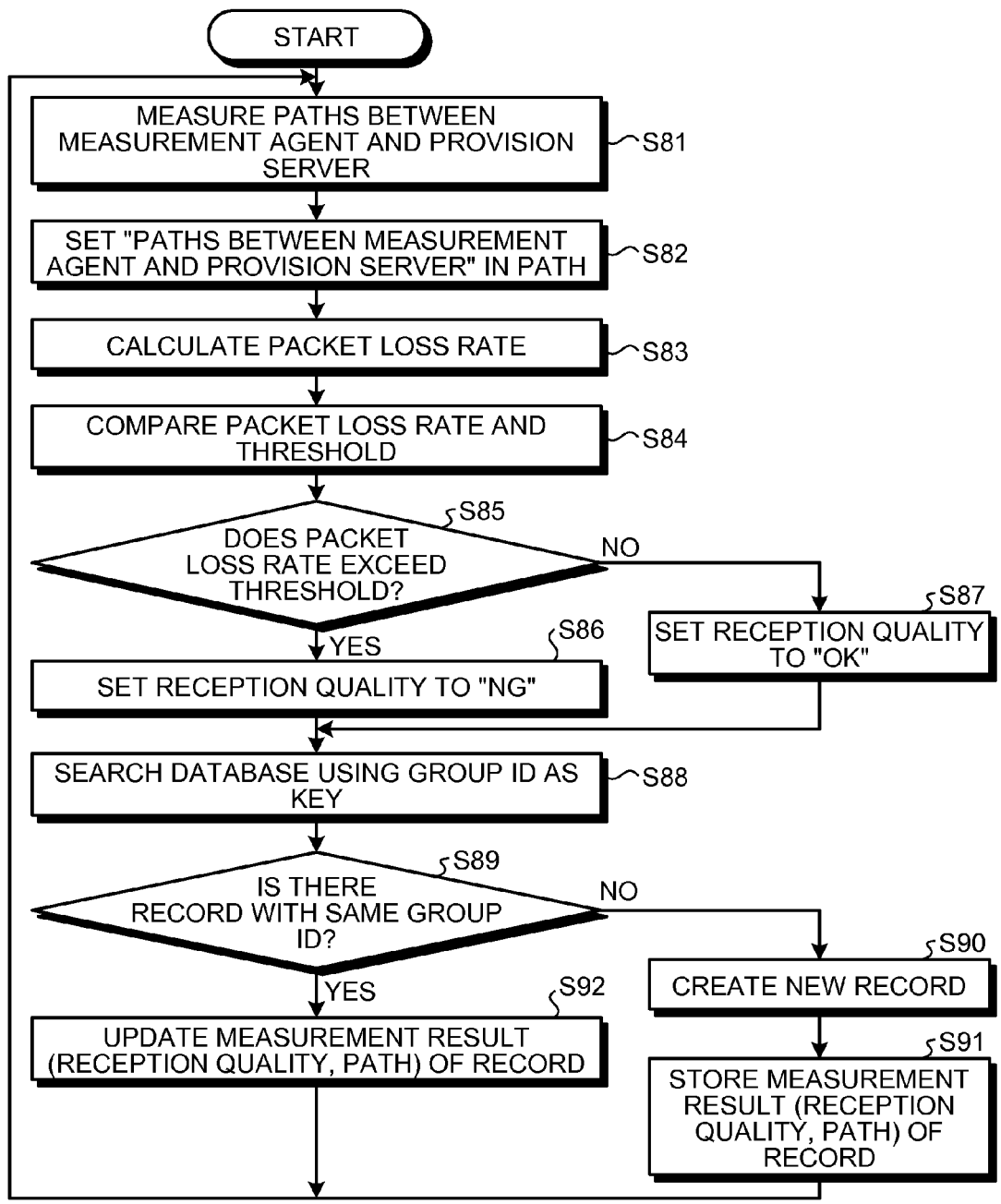
FIG. 19 is a flowchart of a measurement-information obtaining process performed by the measurement agent according to the first embodiment.

The measurement-information obtaining process performed by the measurement agent according to the first embodiment is explained with reference to FIG. 19. FIG. 19 is a flowchart of a measurement-information obtaining process performed by the measurement agent according to the first embodiment. In this example, a process performed when the measurement time counter reaches 10 seconds, which is the calculation interval of the measurement results, or more seconds is explained. The measurement time counter is reset to zero when following processes are finished.

As depicted in FIG. 19, the measuring unit 12d of the measurement agent 10 measures "paths" (Step S81), and sets the "paths" between the provision server and the measurement agent as the measurement result, in the "path" as one element of the measurement result (Step S82). The measuring unit 12d then calculates a packet loss rate based on statistical information obtained from packets related to a received service (Step S83).

The measuring unit 12d then compares the calculated packet loss rate and a threshold for the measurement results previously set (Step S84). When the packet loss rate of the measurement result exceeds "1%", which is the "threshold for the measurement results" (YES at Step S85), the measuring unit 12d sets the reception quality to "NG" (Step S86). When the packet loss rate does not exceeds "1%" (NO at Step S85), the measuring unit 12d sets the reception quality to "OK" (Step S87).

The measuring unit 12d then searches the measurement information database 11b by the group ID as a keyword (Step S88). When there is no record corresponding to the group ID (No at Step S89), the measuring unit 12d creates a new record (Step S90), and stores the measurement result (pair of the reception quality and the path) (Step S91).

When there is a record corresponding to the group ID (YES at Step S89), the measuring unit 12d updates the measurement result (pair of the reception quality and the path) of the record (Step S92).

Figure 20:
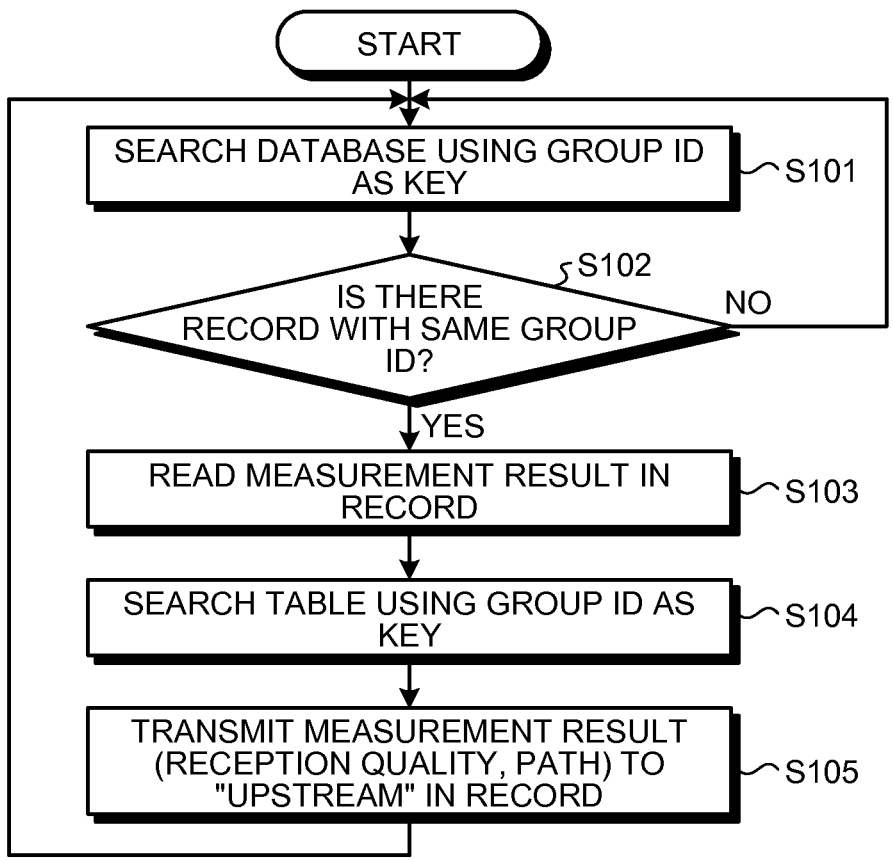
FIG. 20 is a flowchart of a measurement-information transmitting process when a role of the measurement agent is measure.

The measurement-information transmitting process performed when the role of the measurement agent is "measure" is explained with reference to FIG. 20. FIG. 20 is a flowchart of the measurement-information transmitting process performed when the role of the measurement agent is "measure". In this example, a process performed when the reading time counter reaches 10 seconds, which is the reading interval of the measurement results, or more seconds is explained. The reading time counter is updated to zero when following processes are completed.

As depicted in FIG. 20, in a condition of recognizing a group ID of a group in which the role of the measurement agent 10 is "measure", the measurement-information transmitting unit 12f searches the measurement information database 11b by the group ID as a keyword (Step S101). When there is no record corresponding to the group ID (NO at Step S102), the measurement-information transmitting unit 12f does not perform following processes. When there is a record corresponding to the group ID (YES at Step S102), the measurement-information transmitting unit 12f reads the corresponding measurement information (Step S103).

The measurement-information transmitting unit 12f searches the group information table 11a by the group ID as a keyword, thereby obtaining the IP address and the port number of an "upstream" measurement agent as a transmission destination of the measurement result (Step S104). The measurement-information transmitting unit 12f then transmits the measurement result to the "upstream" measurement agent (Step S105).

The narrowed-result transmitting process performed when the role of the measurement agent is "relay" is explained with reference to FIG. 21. FIG. 21 is a flowchart of the narrowed-result transmitting process performed when the role of the measurement agent is "relay". In this example, a process performed when the reading time counter reaches 10 seconds, which is the reading interval of the measurement results, or more seconds is explained. The reading time counter is updated to zero when following processes are completed.

As depicted in FIG. 21, in a condition that a group ID of a group in which the role of the measurement agent is "relay" is recognized by searching the group information table 11a by the "role" as a keyword, the measurement-information analyzing unit 12e of the measurement agent 10 searches the measurement information database 11b by the group ID as a keyword (Step S111). When there is no record corresponding to the group ID (NO at Step S112), the measurement-information analyzing unit 12e does not perform following processes. When there is a record corresponding to the group ID (YES at Step S112), the measurement-information analyzing unit 12e reads all the measurement information corresponding to the group ID (Step S113).

The measurement-information analyzing unit 12e extracts based on the obtained measurement results, a portion as candidates of the failure location from among the paths included in the measurement results, and sets the extracted candidates of the failure location in the "path" as an element of the measurement result (Step S114).

When no candidate of the failure location remains as a result of the extraction (NO at Step S115), the measurement-information analyzing unit 12e does not perform following processes. When there is a candidate of the failure location (YES at Step S115), the measurement-information analyzing unit 12e sets the "reception quality" as an element of the measurement result to NG (Step S116), and transfers the measurement result to the measurement-information transmitting unit 12f. The measurement-information transmitting unit 12f searches the group information table 11a by the group ID as a keyword (Step S117), obtains the IP address and the port number of an "upstream" measurement agent as a transmission destination of the measurement result, and transmits the measurement result to the "upstream" measurement agent (Step S118).

The narrowed-result transmitting process performed when the role of the measurement agent is "representative" is explained with reference to FIG. 22. FIG. 22 is a flowchart of the narrowed-result transmitting process performed when the role of the measurement agent is "representative". In this example, a process performed when the reading time counter reaches 10 seconds, which is the reading interval of the measurement results, or more seconds is explained. The reading time counter is updated to zero when following processes are completed.

As depicted in FIG. 22, in a condition that a group ID of a group in which the role of the measurement agent is "representative" is recognized by searching the group information table 11a by the "role" as a keyword, the measurement-information analyzing unit 12e of the measurement agent 10 searches the measurement information database 11b by the group ID as a keyword (Step S121). When there is no record corresponding to the group ID (NO at Step S122), the measurement-information analyzing unit 12e does not perform following processes. When there is a record corresponding to the group ID (YES at Step S122), the measurement-information analyzing unit 12e reads all the measurement information corresponding to the group ID (Step S123).

The measurement-information analyzing unit 12e extracts based on the obtained measurement results, a portion as candidates of the failure location from among paths included in the measurement results, and sets the extracted candidates of the failure location in the "path" as an element of the measurement result (Step S124).

When no candidate of the failure location remains as a result of the extraction (NO at Step S125), the measurement-information analyzing unit 12e does not perform following processes. When there is a candidate of the failure location (YES at Step S125), the measurement-information analyzing unit 12e sets the "reception quality" as an element of the measurement result to NG (Step S126), and transfers the measurement results to the measurement-information transmitting unit 12f (Step S127). The measurement-information transmitting unit 12f then transmits the measurement results to the surveillance server 20 (Step S128).

A detailed process performed by the surveillance server after the measurement results are obtained is explained with reference to FIG. 23. FIG. 23 is a flowchart of a detailed process performed by the surveillance server according to the first embodiment after the measurement results are obtained. In this example, a process performed when the reading time counter reaches 10 seconds, which is the reading interval of the measurement results, or more seconds is explained. The reading time counter is updated to zero when following processes are completed.

As depicted in FIG. 23, the measurement-information analyzing unit 22b of the surveillance server 20 reads all the measurement results from the measurement information database 21a (Step S131). The measurement-information analyzing unit 22b then extracts based on the obtained measurement results, a portion as candidates of the failure location from among the paths included in the measurement results (Step S132). When no candidates of the failure location remains as a result of the extraction (NO at Step S133), the measurement-information analyzing unit 22b does not perform following processes.

The measurement-information analyzing unit 22b then specifies the extracted candidates of the failure location as the failure location (Step S134), and stores the result of the specification in the analysis result database 21b. The failure-location publicizing unit 22c then obtains information related to the failure location from the analysis result database 21b, and publicizes the information to the network entities (Step S135).

Effect of First Embodiment

As described above, the network failure detecting system 1 groups the measurement agents 10 that receive the service from the same provision server, and decentrally analyzes the measurement results in the measurement agents in each group. In this way, the amount of information managed by the surveillance server 20 is reduced, and a failure location on the network can be detected quickly without causing the memory overflow or the like. Consequently, the network failure detecting system 1 provides particularly quick failure detection with high failure detection accuracy.

[b] Second Embodiment

While an exemplary embodiment of the present invention has been explained above, the invention can be also carried out by various embodiments other than the above embodiment. Another embodiment included in the present invention is explained below as a second embodiment of the invention.

(1) Random

In the first embodiment, the example in which the ID corresponding to the provision server is obtained as the group ID has been explained. The present invention is not limited thereto, and the group ID can be obtained based on a value randomly generated.

Figure 24:
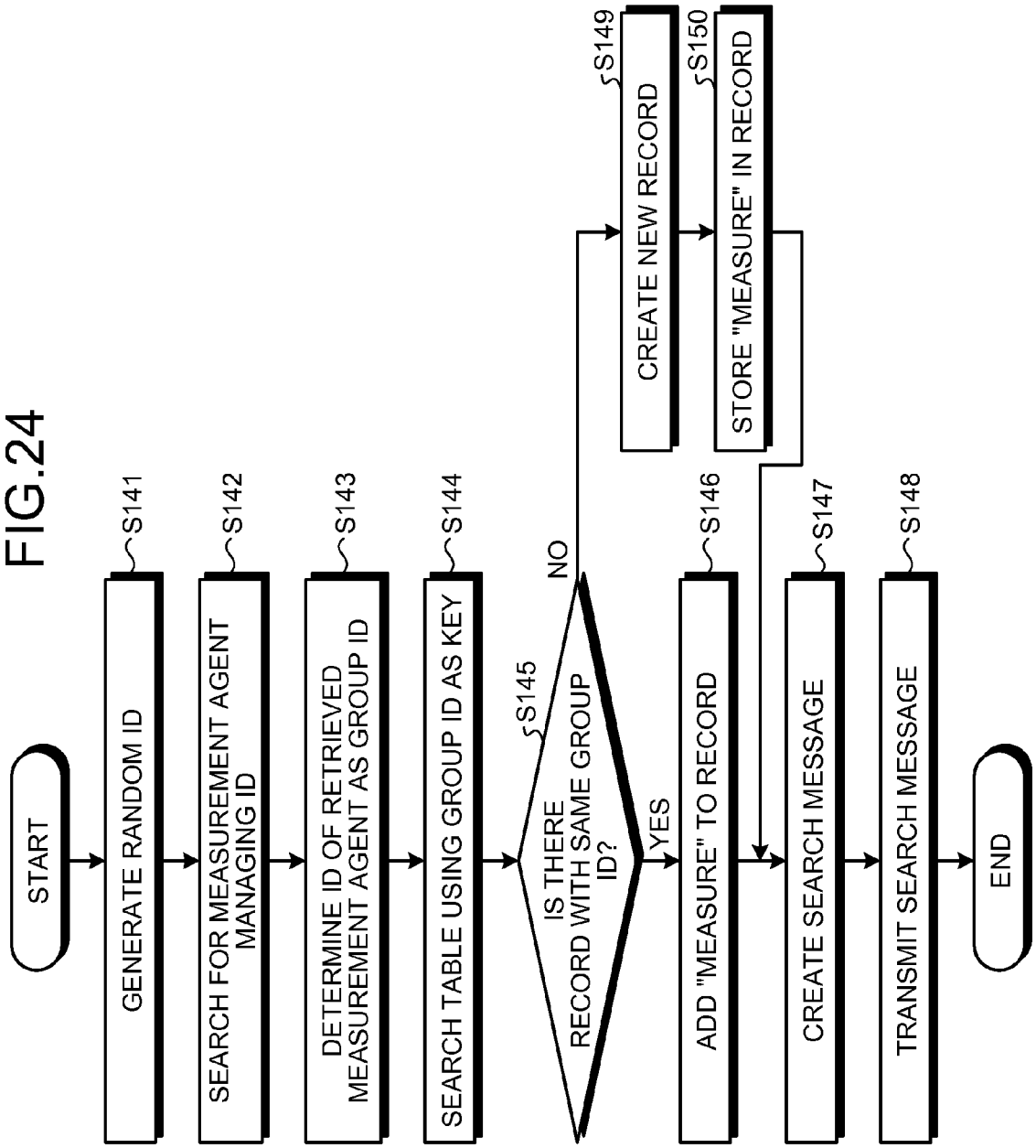
FIG. 24 is a flowchart of a processing operation for obtaining a group ID based on a value randomly generated in a network failure detecting system according to a second embodiment of the present invention.

A specific procedure of the process of obtaining the group ID based on a value randomly generated is explained with reference to FIG. 24. As depicted in FIG. 24, the measurement agent 10a first generates a random ID (Step S141). The measurement agent 10a then searches for a measurement agent that manages the random ID (Step S142), and determines the ID of the retrieved measurement agent as the group ID (Step S143). Processes at Steps S144 to S150 are the same as those at Steps S34 to S40 in FIG. 14 explained above.

That is, when the random ID generated by the measurement agent is used as the group ID, there is a possibility that no or few measurement agents generate the same ID, resulting in a large number of groups (group IDs), and consequently the loads on the surveillance server cannot be reduced. However, when the processes above described are performed, all random IDs included in the range of IDs managed by the measurement agent lead to the group ID of the same group. Therefore, the number of groups does not become too large.

In this way, it is possible to obtain the group ID by using the random ID and reduce the loads on the surveillance server, thereby quickly detecting a failure.

(2) Elimination of Measurement Agents

Figure 25:
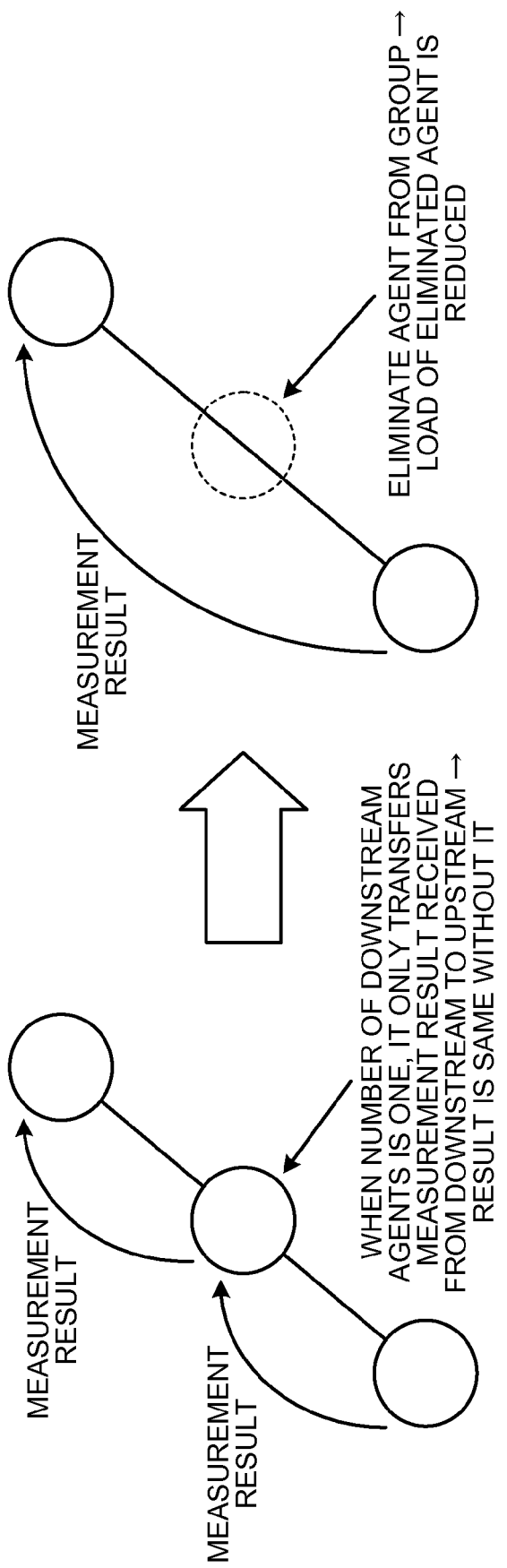
FIG. 25 is a schematic diagram illustrating a process of eliminating an unnecessary measurement agent from a group in the network failure detecting system according to the second embodiment.

In the present invention, it is also possible to eliminate unnecessary measurement agents from a group. That is, a measurement agent having one downstream measurement agent as depicted in FIG. 25 only transfers a measurement result received from the downstream measurement agent to an upstream measurement agent, and is unnecessary. Accordingly, this unnecessary measurement agent is eliminated from the group.

Specifically, a "representative" measurement agent in a group transmits a "group reconfiguring message" for reconfiguring the group to downstream measurement agents. The measurement agents that receive the message check the number of downstream measurement agents. When the number of downstream measurement agents is "one", the measurement agent that receives the message withdraws from the group, and transfers a message to the effect that the measurement agent is eliminated, to a measurement agent downstream of the eliminated measurement agent.

When unnecessary measurement agents 10 are eliminated in this way, loads of the eliminated agents are reduced, and the detection accuracy can be enhanced.

(3) System Configuration or the Like

The respective constituent elements of the respective devices depicted in the drawings are functionally conceptual, and physically the same configuration is not always necessary. That is, the specific mode of distribution and integration of the devices are not limited to the depicted ones, and all or a part thereof can be functionally or physically distributed or integrated in an arbitrary unit, according to various kinds of load and the status of use. For example, the measurement-information receiving unit 12c and the measuring unit 12d can be integrated. Furthermore, all or an arbitrary part of each processing function performed by the respective devices can be realized by a central processing unit (CPU), or by a program analyzed and executed in the CPU, or realized as hardware by a wired logic.

Among respective processes described in the above embodiments, all or a part of the processes explained as being performed automatically can be performed manually, or all or a part of the processes explained as being performed manually can be performed automatically by a known method. In addition, process procedures, control procedures, specific names, and information including various kinds of data and parameters mentioned in this specification and the drawings can be arbitrarily changed unless otherwise specified.

(4) Program

Figure 26:
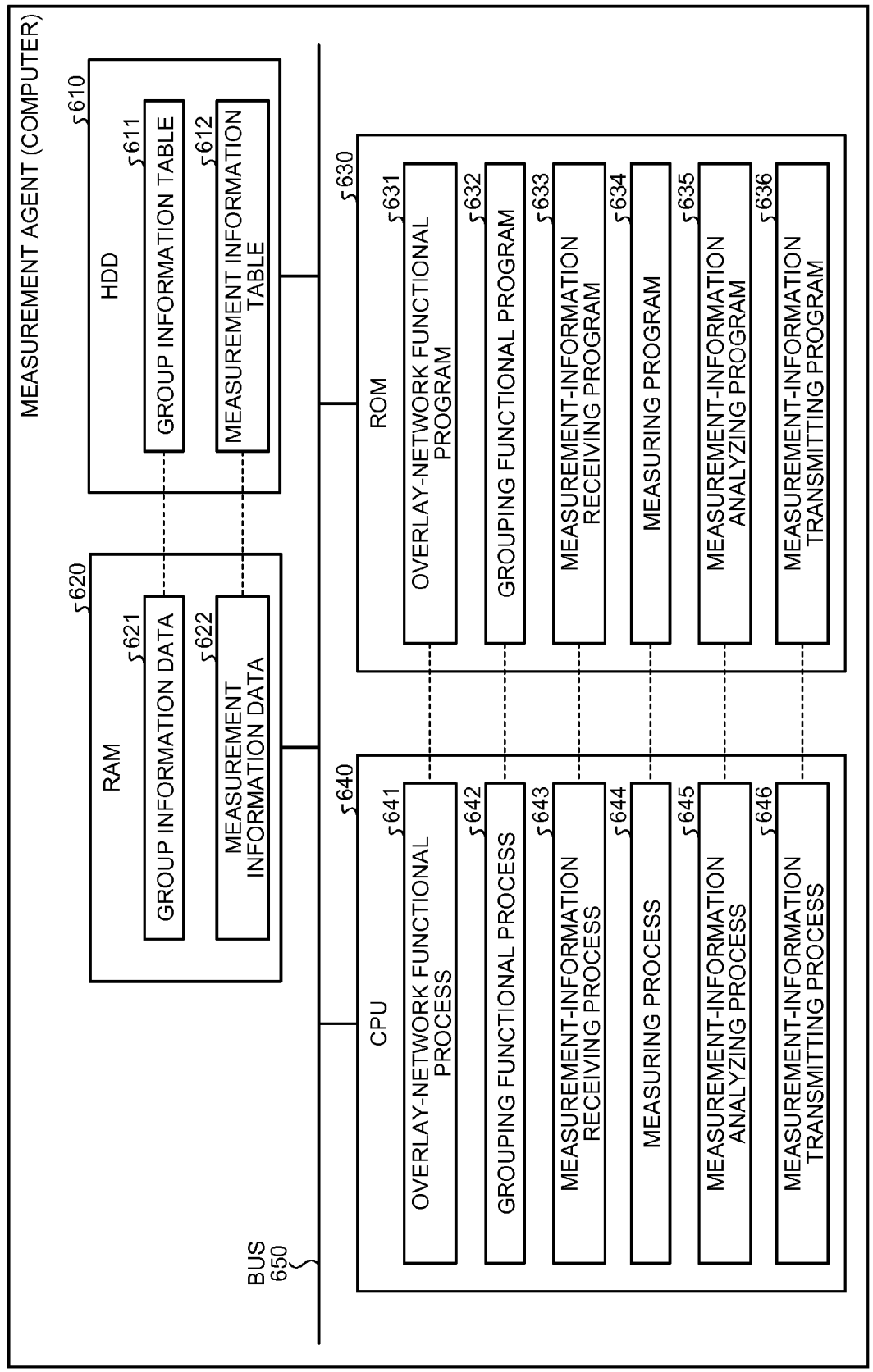
FIG. 26 depicts a computer that executes a network failure detecting program.
Figure 27:
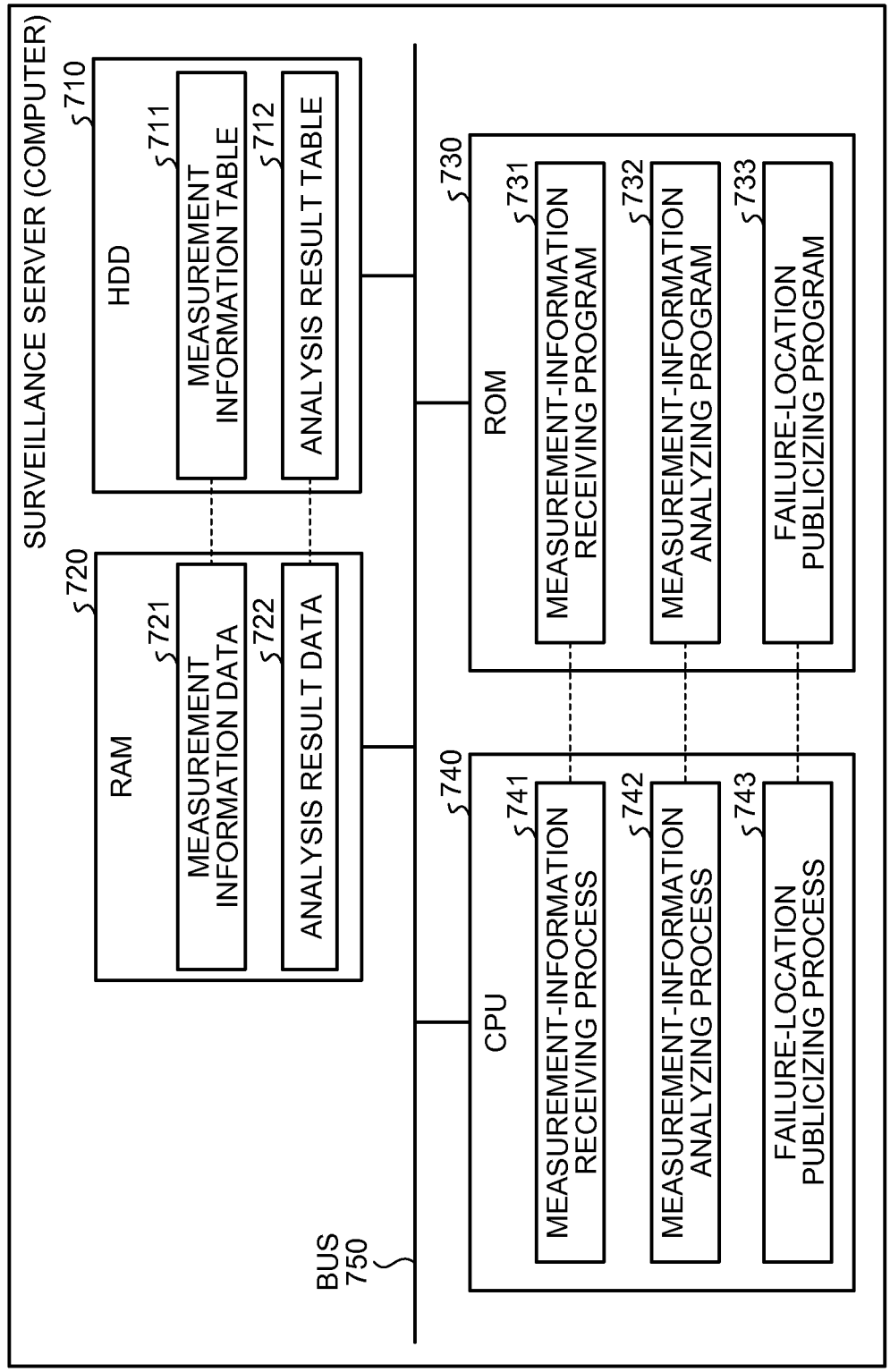
FIG. 27 depicts a computer that executes a network failure detecting program.
Figure 28:
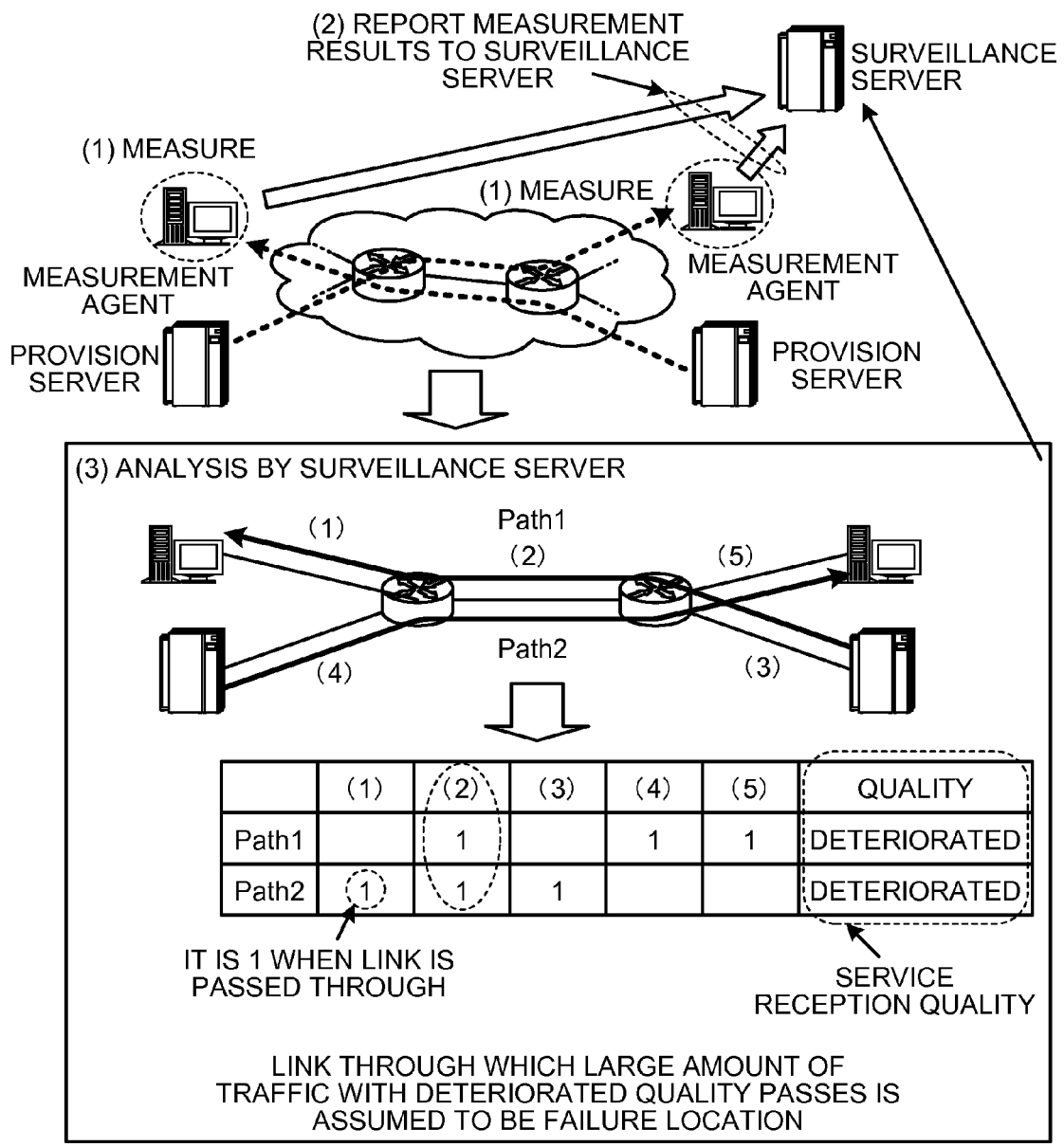
FIG. 28 is a schematic diagram illustrating a conventional technique.

The processes explained in the first embodiment can be realized by causing a computer to execute a program previously provided. An example of a computer that executes a program having the same functions as those in the first embodiment is explained below with reference to FIGS. 26 and 27. FIGS. 26 and 27 depict a computer that executes a network failure detecting program.

As depicted in FIG. 26, a computer 600 that works as a measurement agent includes a hard disk drive (HDD) 610, a random access memory (RAM) 620, a read only memory (ROM) 630, and a CPU 640, which are connected via a bus 650.

The ROM 630 has previously stored therein a network failure detecting program that provides the same functions as those in the first embodiment, that is, an overlay-network functional program 631, a grouping functional program 632, a measurement-information receiving program 633, a measuring program 634, a measurement-information analyzing program 635, and a measurement-information transmitting program 636, as depicted in FIG. 26. The programs 631 to 636 can be properly integrated or distributed, like the constituent elements of the measurement agent 10 depicted in FIG. 2.

The CPU 640 reads the programs 631 to 636 from the ROM 630 and executes the programs, so that the programs 631 to 636 function as an overlay-network functional process 641, a grouping functional process 642, a measurement-information receiving process 643, a measuring process 644, a measurement-information analyzing process 645, and a measurement-information transmitting process 646, respectively, as depicted in FIG. 26. The processes 641 to 646 correspond to the overlay-network functional unit 12a, the grouping functional unit 12b, the measurement-information receiving unit 12c, the measuring unit 12d, the measurement-information analyzing unit 12e, and the measurement-information transmitting unit 12f depicted in FIG. 2, respectively.

The HDD 610 includes a group information table 611 and a measurement information table 612, as depicted in FIG. 26. The group information table 611 and the measurement information table 612 correspond to the group information table 11a and the measurement information database 11b depicted in FIG. 2, respectively. The CPU 640 registers data in the group information table 611 and the measurement information table 612. The CPU 640 reads group information data 621 and measurement information data 622 from the group information table 611 and the measurement information table 612 to be stored in the RAM 620, respectively, thereby performing a process of managing information based on the group information data 621 and the measurement information data 622 stored in the RAM 620.

A computer 700 that works as a surveillance server includes a HDD 710, a RAM 720, a ROM 730, and a CPU 740, which are connected via a bus 750, as depicted in FIG. 27.

The ROM 730 has previously stored therein a network failure detecting program that provides the same functions as those in the first embodiment, that is, a measurement-information receiving program 731, a measurement-information analyzing program 732, and a failure-location publicizing program 733, as depicted in FIG. 27. The programs 731 to 733 can be properly integrated or distributed, like the constituent elements of the measurement agent 10 depicted in FIG. 8.

The CPU 740 reads the programs 731 to 733 from the ROM 730 and executes the programs, so that the programs 731 to 733 function as a measurement-information receiving process 741, a measurement-information analyzing process 742, and a failure-location publicizing process 743, respectively, as depicted in FIG. 27. The processes 741 to 743 correspond to the measurement-information receiving unit 22a, the measurement-information analyzing unit 22b, and the failure-location publicizing unit 22c depicted in FIG. 8, respectively.

The HDD 710 includes a measurement-result information table 711 and an analysis result table 712 as depicted in FIG. 27. The measurement-result information table 711 and the analysis result table 712 correspond to the measurement information database 21a and the analysis result database 21b depicted in FIG. 8, respectively. The CPU 740 registers data in the measurement-result information table 711 and the analysis result table 712. The CPU 740 reads measurement-result information data 721 and analysis result data 722 from the measurement-result information table 711 and the analysis result table 712 to be stored in the RAM 720, and performs a process of managing information based on the measurement-result information data 721 and the analysis result data 722 stored in the RAM 720.

According to an embodiment, the measurement agents that receive the service from the same provision server are grouped, and the measurement agents in each group decentrally analyze measurement results, thereby reducing the amount of information to be managed by the surveillance server and quickly detecting a failure location on a network without causing the memory overflow or the like. As a result, particularly quick failure detection with high failure detection accuracy can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network failure detecting system comprising:
measurement agents that are placed on a network and measure qualities of services provided by provision servers or analyze measurement results, the measured qualities of services; and
a surveillance server that specifies a failure location of the network based on analysis results by a measurement agent, wherein
a measurement agent includes a processor, the processor executing a first process comprising:
forming a link, by configuring a group together with other measurement agents that receive a service from a same provision server and creating a tree structure with a predetermined measurement agent in the group at a top, and calculating a group identifier based on an identifier of the provision server;
measuring the qualities of services and transmitting the measured qualities of services as measurement results to one of the other measurement agents included in the group;
first receiving measurement results from a measurement agent included in the group;
detecting a candidate of the failure location based on the measurement results received at the first receiving;
second receiving a candidate of the failure location from a measurement agent included in the group, the candidate being detected therein;
narrowing down the detected candidate and the candidate received at the second receiving to a candidate of the failure location; and
first transmitting the detected candidate of the failure location or the narrowed down candidate of the failure location to either the surveillance server or one of the other measurement agents, wherein
the processor executes either the measuring or the first transmitting according to a position in the tree structure of a group indicated by the group identifier, and
the surveillance server includes a processor, the processor executing a second process comprising:
third receiving the candidate of the failure location transmitted at the first transmitting; and
specifying the failure location based on the candidate of the failure location received at the third receiving.

2. The network failure detecting system according to claim 1, wherein the first process further includes transmitting a search message including the group identifier to the network, to form the link.

3. The network failure detecting system according to claim 2, wherein the first process further includes second transmitting the measurement results to one of the other measurement agents included in the group, when the search message including the group identifier is created and transmitted to the network.

4. The network failure detecting system according to claim 2, wherein when the search message is received from a measurement agent included in the group and the search message is transmitted to another measurement agent in the group, the first transmitting includes transmitting the candidate of the failure location to the another measurement agent in the group corresponding to the group identifier included in the search message.

5. The network failure detecting system according to claim 2, wherein when the search message is received from a measurement agent included in the group and there is no other measurement agent to which the search message is to be transmitted, the first transmitting includes transmitting the candidate of the failure location to the surveillance server.

6. The network failure detecting system according to claim 2, wherein the first process further includes first storing in a grouping-information storage unit an identifier of a measurement agent the search message being received therefrom, and an identifier of one of the other measurement agents the search message transmitted thereto, with respect to each group identifier included in the search message.

7. The network failure detecting system according to claim 1, wherein the first process further includes second storing in a measurement-information storage unit reception qualities of services of the provision server and information of paths to the provision server as the measurement results with respect to each group.

8. The network failure detecting system according to claim 7, wherein the first process further includes transmitting periodically the measurement results stored at the second storing to one of other measurement agents in the group.

9. The network failure detecting system according to claim 4, wherein
the first process further includes detecting a candidate of the failure location based on the measurement results received from a measurement agent located downstream included in the group, and
the first transmitting further includes transmitting the detected candidate of the failure location to another measurement agent located upstream included in the group.

10. The network failure detecting system according to claim 5, wherein
the first process further includes detecting a candidate of the failure location based on the measurement results received from a measurement agent located downstream in the group, and
the first transmitting further includes transmitting the detected candidate of the failure location to the surveillance server.

11. The network failure detecting system according to claim 1, wherein the first process further includes
generating a random value;
searching for a measurement agent that manages the generated random value; and
forming the link by setting an identifier of the measurement agent retrieved at the searching as a group identifier, and transmitting a search message including the group identifier to the network.

12. The network failure detecting system according to claim 1, wherein the first process further includes
third transmitting a group reconfiguring message for reconfiguring a group to a measurement agent located downstream included in the group; and
eliminating, upon reception of the group reconfiguring message transmitted at the third transmitting, a measurement agent that has received the group reconfiguring message from the group when number of other measurement agents located downstream in the group is one.

13. The network failure detecting system according to claim 1, wherein the first process further includes transmitting the narrowed down candidate of the failure location to either the surveillance server or one of the other measurement agents according to a position in the tree structure of a group indicated by the group identifier.

14. A measurement agent that is placed on a network to measure qualities of services provided by provision servers, analyze measurement results, the measured qualities of services, or transmits analysis results to a surveillance server, the measurement agent including a processor, the processor executing a process comprising:
forming a link by configuring a group together with other measurement agents that receive a service from a same provision server and creating a tree structure with a predetermined measurement agent in the group at a top, and calculating a group identifier based on an identifier of the provision server;
measuring the qualities of services and transmitting the measured qualities of services as measurement results to one of the other measurement agents included in the group;
first receiving measurement results from a measurement agent included in the group;
detecting a candidate of a failure location of the network based on the measurement results received at the first receiving;
second receiving a candidate of the failure location from a measurement agent included in the group, the candidate being detected therein;
narrowing down the detected candidate and the candidate received at the second receiving to a candidate of the failure location; and
transmitting the detected candidate of the failure location or the narrowed down candidate of the failure location to either the surveillance server or one of the other measurement agents, wherein
the processor executes either the measuring or the transmitting according to a position in the tree structure of a group indicated by the group identifier.

15. The network failure detecting system according to claim 1, wherein the first receiving includes receiving the measurement results transmitted from a measurement agent included in the group and located downstream in the tree structure, the measurement results being measured therein.

16. The measurement agent according to claim 14, wherein the first receiving includes receiving the measurement results transmitted from a measurement agent included in the group and located downstream in the tree structure, the measurement results being measured therein.

* * * * *